(12) United States Patent
Saso et al.

(10) Patent No.: US 6,929,284 B1
(45) Date of Patent: Aug. 16, 2005

(54) GAS GENERATOR

(75) Inventors: Takashi Saso, Himeji (JP); Koji Tanaka, Himeji (JP)

(73) Assignee: Nippon Kayaku Kabushiki-Kaisha, Tokyo (JP)

(*) Notice: Subject to any disclaimer, the term of this patent is extended or adjusted under 35 U.S.C. 154(b) by 0 days.

(21) Appl. No.: 09/890,765

(22) PCT Filed: Feb. 4, 2000

(86) PCT No.: PCT/JP00/00613

§ 371 (c)(1),
(2), (4) Date: Aug. 3, 2001

(87) PCT Pub. No.: WO00/46078

PCT Pub. Date: Aug. 10, 2000

(30) Foreign Application Priority Data

Feb. 5, 1999 (JP) .................................. 11-028763
Feb. 9, 1999 (JP) .................................. 11-031364

(51) Int. Cl.[7] .............................................. B60R 21/26
(52) U.S. Cl. ........................ 280/741; 280/736; 280/742
(58) Field of Search ................................ 280/735, 736, 280/740, 741, 742

(56) References Cited

U.S. PATENT DOCUMENTS

| | | | | |
|---|---|---|---|---|
| 5,527,067 A | * | 6/1996 | Iwai et al. | 280/741 |
| 5,613,705 A | * | 3/1997 | Hock et al. | 280/741 |
| 5,711,546 A | * | 1/1998 | Hamilton et al. | 280/736 |
| 5,788,275 A | * | 8/1998 | Butt et al. | 280/737 |
| 5,938,235 A | * | 8/1999 | Butt | 280/737 |
| 6,032,979 A | * | 3/2000 | Mossi et al. | 280/741 |
| 6,095,560 A | * | 8/2000 | Perotto | 280/741 |
| 6,189,924 B1 | * | 2/2001 | Hock | 280/736 |
| 6,234,521 B1 | * | 5/2001 | Katsuda et al. | 280/736 |
| 6,283,505 B1 | * | 9/2001 | Saso et al. | 280/741 |
| 6,378,901 B1 | * | 4/2002 | Yamazaki et al. | 280/741 |
| 6,485,051 B1 | * | 11/2002 | Taguchi et al. | 280/736 |
| 6,488,310 B1 | * | 12/2002 | Ryobo et al. | 280/736 |
| 6,491,320 B1 | * | 12/2002 | Nakashima et al. | 280/736 |
| 6,491,321 B1 | * | 12/2002 | Nakashima et al. | 280/736 |

FOREIGN PATENT DOCUMENTS

| | | |
|---|---|---|
| EP | 0 787 630 | 8/1997 |
| JP | 6-27379 | 4/1994 |
| JP | 11-59318 | 3/1999 |
| JP | 11-222094 | 8/1999 |

* cited by examiner

Primary Examiner—Paul N. Dickson
Assistant Examiner—Toan C To
(74) Attorney, Agent, or Firm—Oblon, Spivak, McClelland, Maier & Neustadt, P.C.

(57) ABSTRACT

A gas generator for slowly inflating an air bag at the early stage of the inflation and then rapidly inflating it or discharge a clean gas evenly around a housing. The gas generator includes a gas generating agent (6) and an squib (8,9) in the housing (1). The squib (9) is disposed eccentrically to the axis (a) of the housing (1). A high temperature gas is generated in a combustion chamber (4) because of the combustion of the gas generating agent (6) ignited by the squib (9). The permeability of the high temperature gas through inner cylindrical member (2) closest to the squib (9) is lower than that through the part other than the inner cylindrical member (2).

2 Claims, 25 Drawing Sheets

Wire netting of stockinet

GAS GENERATOR

TECHNICAL FIELD

The present invention relates to a device for inflating an air bag for an automobile and particularly to a gas generator for controlling a deployment process of the air bag.

BACKGROUND TECHNIQUE

A gas generator for rapidly inflating an air bag so as to protect a driver and etc, from an impact caused in a collision of the automobile, is incorporated into an air bag module mounted in a steering wheel. This gas generator instantaneously generates a large amount of high-temperature gas in response to a collision detection signal of a collision sensor in the event of collision.

As one example of the gas generator for inflating the air bag, there is one shown in FIG. 25. This gas generator includes a housing 100, formed by an upper case 101 and a lower case 102 of a double cylindrical structure of having lids. The housing 100 has a structure in which an annular airtight space S is formed in the inside, by abutting and friction-welding at inner cylindrical portions of the upper case 101 and a lower case 102 and outer cylindrical portions thereof. In the airtight space S in the housing 100, gas generating agents 103 and a cylindrical filter member 104 are successively housed from the inner cylindrical portion toward the outer cylindrical portion. In the inner cylindrical portion, an igniter 105 ignited in response to a collision detection signal from a collision sensor and an inflammation agent 106 fired by ignition of the igniter 105 are disposed.

In the gas generator, the igniter 105 is ignited in response to the collision detection signal from the collision sensor to fire the inflammation agent 106. A flame of the inflammation agent 106 spouts through an igniter hole 107 of the inner cylindrical portion into the airtight space S, and the gas generating agents 103 fires and burns, so that a large amount of high-temperature gas is instantaneously generated. The large amount of high-temperature gas flows into the filter member 104, is subjected to slag collection process and cooling process, and flows into an air bag from a plurality of gas discharge ports 101a of the upper case 101 from now on. The air bag is rapidly inflated by the large amount of clean gas discharged from the respective gas discharge ports 101a.

In the prior-art gas generator, in the case the igniter ignites in response to the collision detection signal from the collision sensor, the large amount of clean gas is instantaneously generated, and then the air bag is rapidly inflated regardless of a form of the collision of the automobile or of a seated posture of the driver. Therefore, in the case the driver is seated near a steering wheel, or even the case the automobile collides at a low speed, the driver receives an impact from the air bag inflating rapidly. As a result, there is a problem that the air bag cannot show a inherent function of protecting the driver.

Therefore, it is an object of the present invention to provide a gas generator for allowing the inherent function of the air bag to be performed by slowly inflating the air bag in an initial stage of inflation and then rapidly inflating the air bag, or evenly discharge the clean gas around the housing.

DISCLOSURE OF THE INVENTION

A first invention is a gas generator for mainly inflating an air bag for a driver's seat, wherein a gas generating agent is loaded in a combustion chamber in a housing and one or more igniters for firing and burning the gas generating agent in the combustion chamber are mounted in the housing. In this gas generator, one or more of the igniters are disposed eccentrically to an axis of the housing. In the gas generator, permeability of the high-temperature gas generated in the combustion chamber by combustion of the gas generating agent by the eccentric igniters is lower through a part closest to the respective igniters than through the other part.

If the gas generating agent is fired and burned by the eccentric igniters as described above, combustion is locally generated in the combustion chamber. Therefore, in the first invention, by varying the permeability of the high-temperature gas, it is possible to distribute the gas throughout the combustion chamber and to evenly discharge the clean gas around the housing even if combustion is locally generated in the combustion chamber. As a result, the air bag is uniformly and smoothly inflated. Therefore, in the first invention, the passenger in the driver's seat does not receive an impact caused by uneven deployment of the air bag even if the passenger is seated near the steering wheel. As a result of this, in the first invention, an inherent function of the air bag is performed in safety.

A second invention is a gas generator for inflating an air bag mainly for a driver's seat, wherein a gas generating agent and a filter member are loaded and disposed in each of a plurality of combustion chambers in a housing and a plurality of igniters for firing and burning the gas generating agents in the respective combustion chambers are disposed in the housing. In this gas generator, one or more igniters are disposed eccentrically to an axis of the housing. In the gas generator, permeability of a high-temperature gas generated in the combustion chambers by combustion of the gas generating agents by the eccentric igniters is lower through a part closest to the respective igniters than through the other part.

If the gas generating agents are fired and burned by the eccentric igniters as described above, combustion is locally generated in the respective combustion chambers. Therefore, in the second invention, by varying the permeability of the high-temperature gas, it is possible to distribute the gas throughout the respective combustion chambers and to evenly discharge the clean gas from respective gas discharge ports around the housing even if combustion is locally generated in the respective combustion chambers.

In the second invention, by actuating the respective igniters at intervals, it is possible to carry out multistage control of inflation in which the air bag is slowly inflated with a small amount of gas generated in only one combustion chamber in an initial stage of inflation of the air bag and then the air bag is rapidly inflated by adding gas generated in other combustion chambers.

Therefore, in the second invention, the passenger in the driver's seat does not receive an impact caused by rapid deployment and inflation of the air bag in the initial stage of inflation and by uneven deployment of the air bag, even if the passenger is seated near the steering wheel. As a result of this, in the second invention, an inherent function of the air bag is performed in safety.

In the second invention, as a structure for evenly discharge the clean gas around the housing, one or more of structures of the gas passing holes of the inner cylindrical member, the gas discharge ports of the housing, and the filter member are employed. In any of the structures, it is possible to reliably discharge the clean gas from the gas discharge ports around the housing with a simple structure.

A third invention is a gas generator for mainly inflating an air bag for a driver's seat, wherein a gas generating agent is loaded in a combustion chamber in a housing and one or more igniters for firing and burning the gas generating agent in the combustion chamber are disposed in the housing. In this gas generator, one or more of the igniters are disposed eccentrically to an axis of the housing. In the gas generator, firing flames of the eccentric igniters are controlled to spout around the axis of the housing.

In the third invention, it is possible to start combustion to the gas generating agent in the vicinity of the eccentric igniters and in a large area around the axis of the housing at a distance from the igniters, so that it is possible to instantaneously shift the combustion to overall combustion. Therefore, it is possible to evenly generate the high-temperature gas by the eccentric igniters around the axis of the housing and to evenly discharge the clean gas around the housing.

Therefore, in the third invention, the passenger in the driver's seat does not receive an impact caused by uneven deployment of the air bag even if the passenger is seated near the steering wheel, as a result of this the inherent function of the air bag can be performed in safety.

A fourth invention is a gas generator for mainly inflating an air bag for a driver's seat, wherein gas generating agents and a filter member are loaded and disposed in a plurality of combustion chambers in a housing and a plurality of igniters for firing and burning the gas generating agents in the respective combustion chambers are disposed in the housing. In this gas generator, one or more igniters are disposed eccentrically to an axis of the housing. In the gas generator, firing flames of the eccentric igniters are controlled to spout around axis of the housing.

In the fourth invention, it is possible to start combustion to the gas generating agent in the vicinity of the eccentric igniters and in a large area around the axis of the housing at a distance from the igniters, so that it is possible to instantaneously shift the combustion to overall combustion. Therefore, it is possible to evenly generate the high-temperature gas by the eccentric igniters around the axis of the housing and to evenly discharge the clean gas around the housing.

In the fourth invention, by actuating the respective igniters at intervals, it is possible to carry out multistage control of development in which the air bag is slowly inflated with a small amount of gas generated in only one combustion chamber in an initial stage of development of the air bag and then the air bag is rapidly inflated by adding gas generated in other combustion chambers. In the fourth invention, by actuating the respective igniters at intervals, it is possible to carry out multistage control of inflation in which the air bag is slowly inflated with a small amount of gas generated in only one combustion chamber in an initial stage of inflation of the air bag and then the air bag is rapidly inflated by adding gas generated in other combustion chambers.

Therefore, in the fourth invention, the passenger in the driver's seat does not receive an impact caused by rapid deployment and inflation of the air bag in the initial stage of inflation and by uneven deployment of the air bag, even if the passenger is seated near the steering wheel, as a result of this the inherent function of the air bag can be performed in say.

In the fourth invention, as a structure for controlling the firing flames of the eccentric igniters to spout around the axis of the housing, any one of a plurality of firing holes of the igniters, firing holes of firing lids for covering the igniters, and a plurality of firing holes of the igniters opened by the firing flames is employed. In any of the structures, it is possible to reliably spout the firing flames of the eccentric igniters around the axis of the housing with a simple structure.

A fifth invention is a gas generator for mainly inflating an air bag for a driver's seat, wherein a gas generating agent is loaded in a combustion chamber in a housing and one or more igniters for firing and burning the gas generating agent in the combustion chamber are disposed in the housing. In this gas generator, one or more of the igniters are disposed eccentrically to an axis of the housing. In the gas generator, permeability of a high-temperature gas generated in the combustion chamber by combustion of the gas generating agent by the eccentric igniters is lower through a part closest to the respective igniters than through the other part and firing flames of the eccentric igniters are controlled to spout around the axis of the housing.

If the gas generating agents are fired and burned by the eccentric igniters as described above, combustion is locally generated in the combustion chamber. Therefore, in the fifth invention, by varying the permeability of the high-temperature gas, it is possible to distribute the gas throughout the combustion chamber and to evenly discharge the clean gas around the housing even if combustion is locally generated in the combustion chamber. In the fifth invention, it is possible to start combustion to the gas generating agent in the vicinity of the eccentric igniters and in a large area around the axis of the housing at a distance from the igniters, so that it is possible to instantaneously shift the combustion to overall combustion. Therefore, it is possible to evenly generate the high-temperature gas by the eccentric igniters around the axis of the housing and to evenly discharge the clean gas around the housing.

Therefore, in the fifth invention, the passenger in the driver's seat does not receive an impact caused by uneven deployment of the air bag, even if the passenger is seated near the steering wheel, as a result of this the inherent function of the air bag can be performed in safety.

A sixth invention is a gas generator for mainly inflating an air bag for a driver's seat, wherein gas generating agents and a filter member are loaded and disposed in a plurality of combustion chambers in a housing and a plurality of igniters for firing and burning the gas generating agents in the respective combustion chambers are disposed in the housing. In this gas generator, one or more igniters are disposed eccentrically to an axis of the housing. In the gas generator, permeability of a high-temperature gas generated in the combustion chambers by combustion of the gas generating agents by the eccentric igniters is lower through a part closest to the respective igniters than through the other part and firing flames of the eccentric igniters are controlled to spout around the axis of the housing.

If the gas generating agents are fired and burned by the eccentric igniters as described above, the combustion is locally generated in the respective combustion chambers. Therefore, in the sixth invention, by varying the permeability of the high-temperature gas, it is possible to distribute the gas throughout the respective combustion chambers and to evenly discharge the clean gas from respective gas discharge ports around the housing even if combustion is locally generated in the respective combustion chambers. In the sixth invention, it is possible to start combustion to the gas generating agent in the vicinity of the eccentric igniters and in a large area around the axis of the housing at a distance from the igniters, so that it is possible to instantaneously shift the combustion to overall combustion. Therefore, it is possible to evenly generate the high-temperature gas by the eccentric igniters around the axis of the housing and to evenly discharge the clean gas around the housing. Furthermore, in the sixth invention, it is possible to actuate the respective igniters at short intervals. By actuating the respective igniters at intervals, it is possible to carry out multistage control of inflation in which the air bag is slowly inflated with a small amount of gas generated in only one combustion chamber in an initial stage of inflation of the air bag and then the air bag is rapidly inflated by adding gas generated in other combustion chambers.

Therefore, in the sixth invention, the passenger in the driver's seat does not receive an impact caused by rapid deployment and inflation of the air bag in the initial stage of inflation and by uneven deployment of the air bag even if the passenger is seated near the steering wheel. As a result of this, the inherent function of the air bag can be performed in safety.

BEST MODES FOR CARRYING OUT THE INVENTION

In order to describe the present invention further specifically, the invention will be described according to the accompanying drawings.

A gas generator of the invention is mainly used for inflating an air bag for a driver's seat. In the gas generator of the invention, an inside of a housing is partitioned into a plurality of combustion chambers and gas generating agents in each of the combustion chambers are burned by a plurality of igniters, so that a deployment process of the air bag is controllable. In the gas generator of the invention, a clean gas generated by combustion caused by the eccentric igniter is able to evenly discharge from respective gas discharge ports by adopting a structure in which one or more of the respective igniters are disposed eccentrically to an axis of the housing.

The gas generator used for the air bag for the driver's seat will be described below based on FIGS. 1 to 24.

Figure 1:
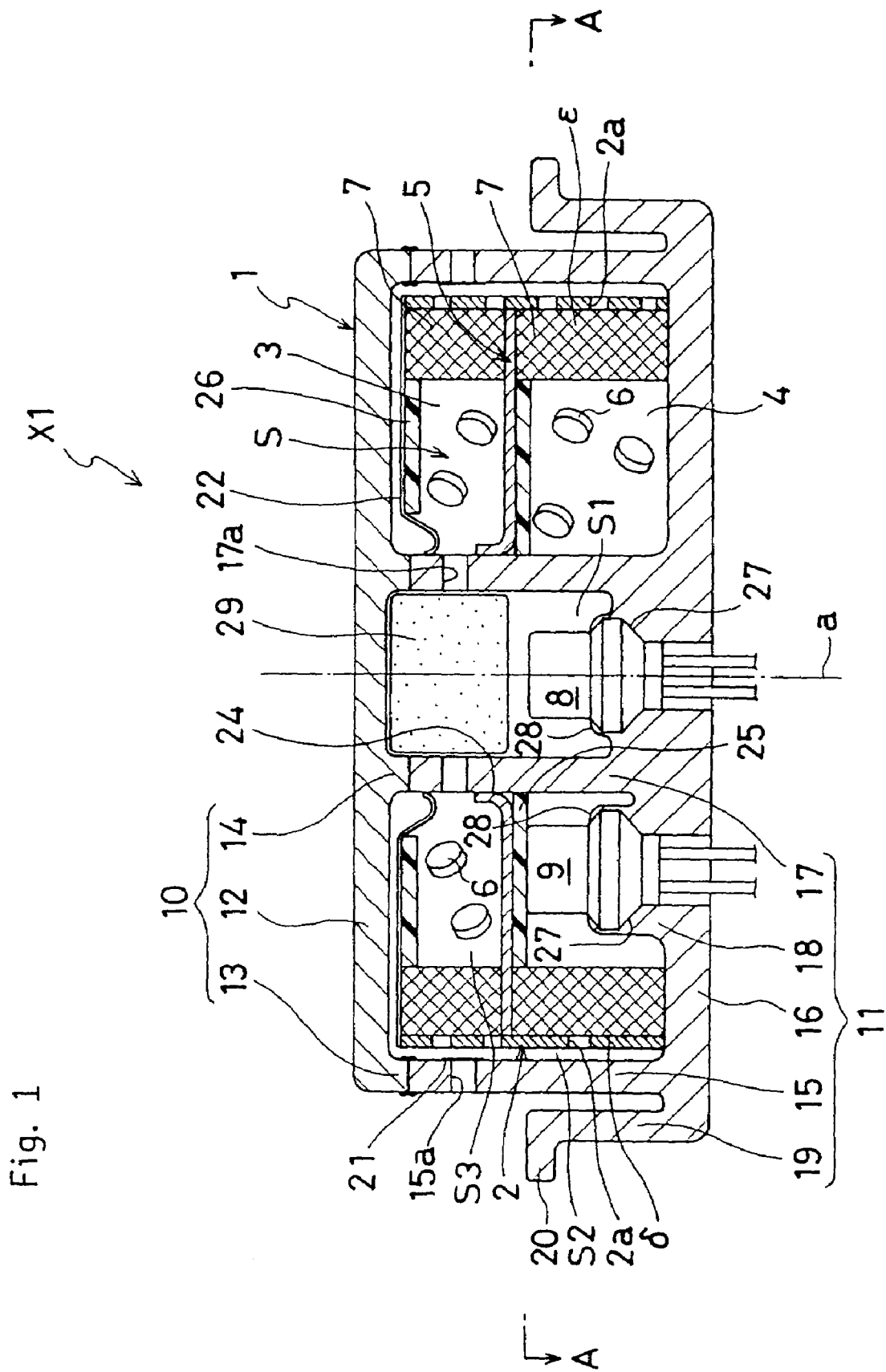
FIG. 1 is a sectional view of a gas generator used for an air bag for a driver's seat according to the present invention.
Figure 2:
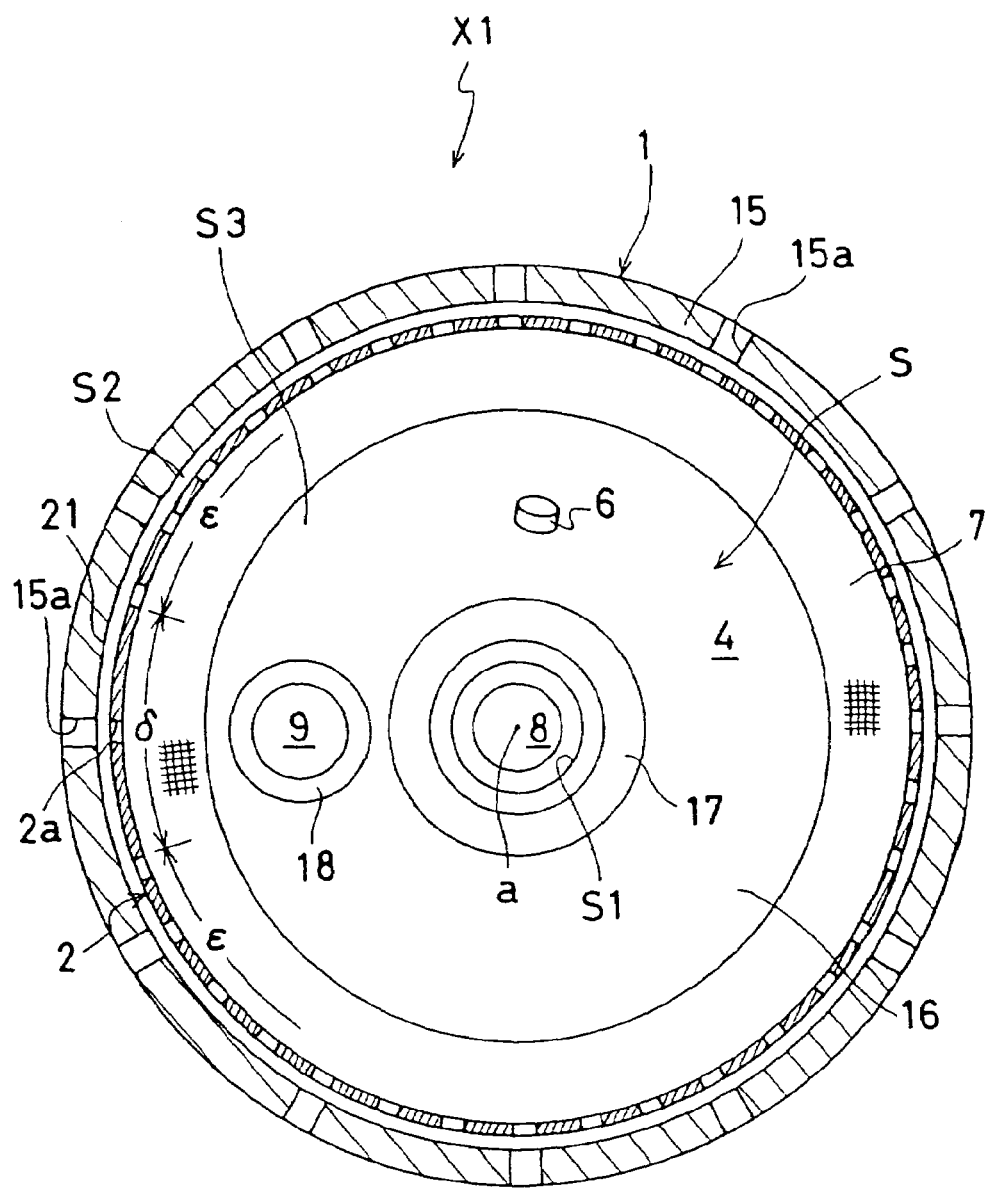
FIG. 2 is a sectional view taken along a line A—A in FIG. 1.

The gas generator X1 shown in FIGS. 1 and 2 can control a deployment process of an air bag and can discharge a clean gas evenly around an outer cylindrical portion 15 from respective gas discharge ports 15a by a structure of an inner cylindrical member 2. The gas generator X1 includes a housing 1 of short cylindrical shape, the inner cylindrical member 2 mounted in the housing 1, a partition member 5 for partitioning an inside of the inner cylindrical member 2 into upper and lower two combustion chambers 3 and 4, gas generating agents 6 and a filter member 7 loaded and disposed in each of the combustion chambers 3 and 4, and two squibs 8 and 9 for independently burning the gas generating agents 6 in the respective combustion chambers 3 and 4.

The housing 1 is a double cylindrical structure in which an annular airtight space S is formed inside by using an upper case 10 and a lower case 11. The upper case 10 has a disc-shaped upper lid portion 12, an outer cylindrical projecting portion 13 projecting from an outer circumferential edge of the upper lid portion 12, and an inner cylindrical projecting portion 14 projecting from a central portion of the upper lid portion 12 into the airtight space S, and these portions 12, 13, and 14 are integrally molded by an aluminum alloy or the like. The lower case 11 has outer cylindrical portion 15 of the short cylindrical shape, a disc-shaped lower lid portion 16 for closing a lower end portion of the outer cylindrical portion 15, and a long inner cylindrical portion 17 extending from a central portion of the lower lid portion 16 into the airtight space S, and these portions 15, 16, and 17 are integrally formed by an aluminum alloy or the like.

A plurality of gas discharge ports opened into the airtight space S are formed in an upper end portion of the outer cylindrical portion 15. The respective gas discharge ports 15a are disposed at predetermined intervals in a circumferential direction of the housing 1 as shown also in FIG. 2. The respective gas discharge ports 15a are closed with a burst plate 21 stuck on an inner surface of the outer cylindrical portion 15. The burst plate 21 is formed by foil of a metal such as aluminum, for example, and has functions of preventing moisture from entering the housing 1 and adjusting an internal pressure at the time of combustion. A plurality of squib holes 17a opening into the airtight space S are formed in an upper end portion of the long inner cylindrical portion 17. The respective squib holes 17a are –disposed at predetermined intervals in the circumferential direction of the housing 1.

The lower lid portion 16 is integrally formed with a short inner cylindrical portion 18 eccentrically located radially outward from an axis of the housing 1. The short inner cylindrical portion 18 projects from between the outer cylindrical portion 15 and the long inner cylindrical portion 17 into inside of the housing 1. A projecting length of the short inner cylindrical portion 18 is shorter than the length of the outer cylindrical portion 15, while a projecting length of the long inner cylindrical portion 17 is the same length as the outer cylindrical portion 15. A flange cylindrical portion 19 extending along a radial outside of the outer cylindrical portion 15 is formed at an outer circumferential edge of the lower lid portion 16. the flange cylindrical portion 19 has a side flange 20 at an upper end portion, and the side flange 20 is bent horizontally to a radially outward direction of the outer cylindrical portion 15. The side flange 20 is mounted to a retainer of an air bag module.

The housing 1 is a double cylindrical structure in which upper and lower end of the outer cylindrical portion 15 and the long inner cylindrical portion 17 are closed with the respective lid portions 12, 16. Specifically, a lower end of the outer cylindrical projecting portion 13 of the upper case 10 is butted against an upper end of the outer cylindrical portion 15 and a lower end of the inner cylindrical projecting portion 14 is butted against an upper end of the long inner cylindrical portion 17 and then the respective lower ends and the upper ends to each other are joined by welding (e.g., friction welding). As a result, the inside of the housing 1 is partitioned into the annular airtight space S and a housing space S1. The annular airtight space S is located between the outer cylindrical projecting portion 13, the outer cylindrical portion 15 and the inner cylindrical projecting portion 14, the long inner cylindrical portion 17, and the housing space S1 is located to inside of the inner cylindrical projecting portion 14 and the long inner cylindrical portion 17.

The airtight space S in the housing 1 is partitioned into the upper and lower two combustion chambers 3, 4 in an axial direction of the housing 1 by the inner cylindrical member 2 and the partition member 5. The inner cylindrical member 2 is formed in a cylindrical shape and is mounted in between the outer cylindrical portion 15 and the short inner cylindrical portion 18, and concentrically located to the inner cylindrical projecting portion 14 and the long inner cylindrical portion 17. The inner cylindrical member 2 is extended from the lower lid portion 16 to a vicinity of the upper lid portion 12. An upper end of the inner cylindrical member 2 is closed with a lid member 22 press-fitted to an outer periphery of the long inner cylindrical portion 17. As a result, the inner cylindrical member 2 partitions the airtight space S in the housing 1 into an annular gas passing space S2 between the outer cylindrical portion 15 and the inner cylindrical member 2 and an annular combustion space S3 between the long inner cylindrical portion 17 and the inner cylindrical member 2. The inner cylindrical member 2 has a plurality of gas passing holes 2a for connecting the gas passing space S2 and the combustion space S3. The respective gas passing holes 2a are disposed axially and circumferentially in the inner cylindrical member 2, as shown also in FIG. 2. The number of gas passing holes 2a of a circumferential part area δ in the inner cylindrical member 2 closest to the short inner cylindrical portion 18 is smaller than that in a circumferential part area ε at a distance from the short inner cylindrical portion 18. As a result, the inner cylindrical member 2 has a structure of which a permeability of gas at the circumferential part area δ closed to the short inner cylindrical portion 18 in the side of the lower combustion chamber 4 is lower than that of the other circumferential part area ε.

Figure 3:
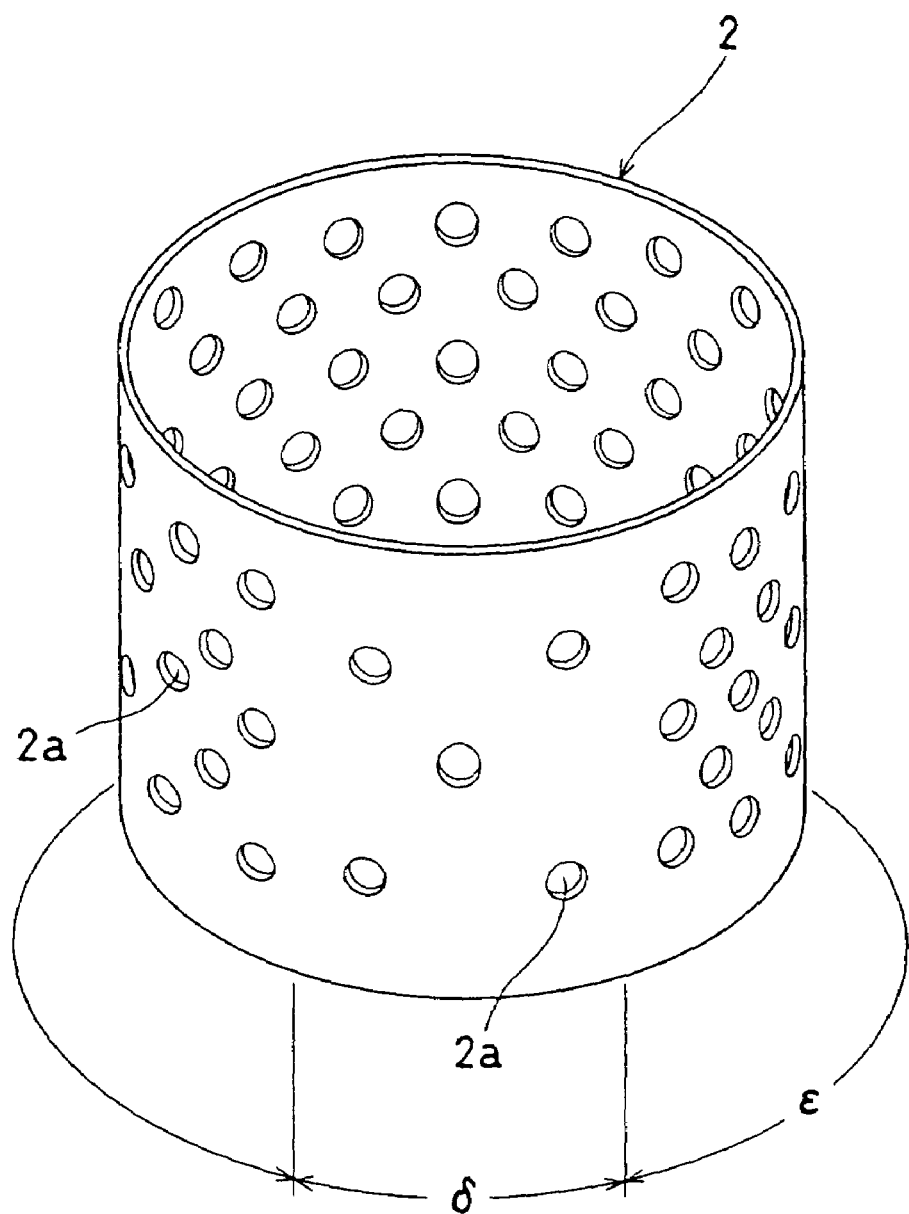
FIG. 3 is an enlarged perspective view showing a structure of an inner cylindrical member.
Figure 4:
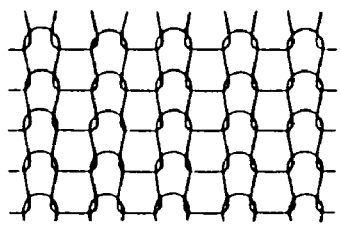
FIGS. 4(a) to 4(c) are drawings showing wire netting of stockinet and crimp-woven metal wire of which a filter member is molded.
Figure 4:
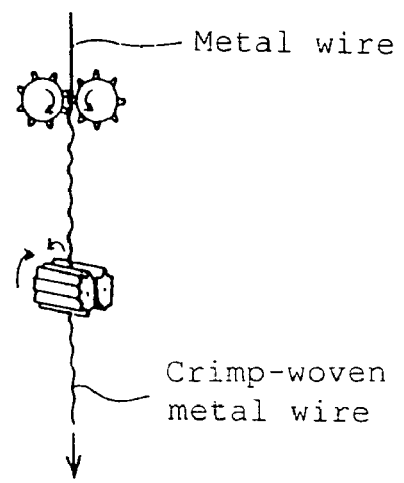
Figure 4:
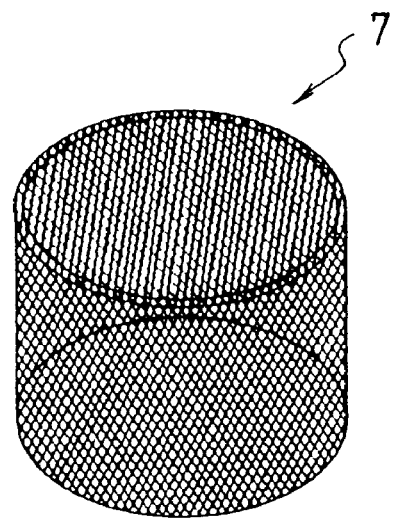

The inner cylindrical member 2 is made of porous sheet steel (e.g., punching metal) formed such that the number of the gas passing holes 2a at the circumferential part area δ in the inner cylindrical member 2 is smaller than that at the other circumferential part area ε, as shown in FIG. 3. The inner cylindrical member 2 is formed by molding a cylindrical shape by the porous sheet steel and then joining opposite ends to each other by a joining method such as spot welding.

The partition member 5 is mounted in between the upper lid portion 12 and the lower lid portion 16, and is mounted in the inner cylindrical member 2, approximately parallel to the upper lid portion 12 and the lower lid portion 16. And partition member 5 partitions the combustion space S3 in inner cylindrical member 2 into the upper and lower two combustion chambers 3, 4 in the axial direction of the housing 1. A through hole 24 of a center of the partition member 5 is fitted in an outer periphery of the long inner cylindrical portion 17, and the partition member 5 is positioned at upper side of short inner cylindrical portion 18 and to state of facing the short inner cylindrical portion 18. As a result, the long inner cylindrical portion 17 is placed to the state of passing through the lower combustion chamber 4 and the partition member 5 and projecting into the upper combustion chamber 3. The short inner cylindrical portion 18 is placed to the state of projecting into the lower combustion chamber 4. In each of the combustion chambers 3, 4, the gas generating agents 6 are loaded into the chambers 3, 4, and the filter member 7 is disposed at surround the gas generating agents 6.

The filter members 7 of the respective combustion chambers 3, 4 are formed to cylindrical shapes which is freely mounted into the inner cylindrical member 2. The filter member 7 of the upper combustion chamber 3 is mounted in the inner cylindrical member 2, and is formed to state of contacting with the lid member 22 from the partition member 5. The filter member 7 of the lower combustion chamber 4 is mounted in the inner cylindrical member 2, and is formed to state of contacting with the partition member 5 from the lower lid portion 16. Each the filter member 7 is preferably produced at a low cost by press-forming wire netting of stockinet as shown in FIG. 4(a) or an assembly of crimp-woven metal wire as shown in FIG. 4(b) into the cylindrical shape as shown in FIG. 4(c).

A cushion member 25 in contact with the partition member 5 is disposed in between the gas generating agents 6 and the partition member 5 in the lower combustion chamber 4. The cushion member 25 has a function of preventing the gas generating agents 6 from powdering by vibration and a function of a heat insulator for suppressing heat transfer between the combustion chambers 3, 4. Therefore, as the cushion member 25, it is preferable to use elastic material such as ceramic fibers having a function of heat insulation. A cushion member 26 in contact with the lid member 22 is disposed in between the gas generating agents 6 and the lid member 22 in the upper combustion chamber 3. The cushion member 26 has a function of preventing the gas generating agents 6 from powdering of by vibration. It is preferable to use elastic material such as silicon rubber and silicon foam as the cushion member 26. It is also possible to use material such as ceramic fibers having the function of heat insulation as the cushion member 26.

The respective squibs 8, 9 are individually mounted in the housing space S1 and the short inner cylindrical portion 18. The respective squibs 8, 9 are joined airtight on a tapered step portions 27 formed in the respective inner cylindrical portions 17, 18 by a sealing members. The respective squibs 8, 9 are fixed caulking by bending to inward at a caulked portion 28, a tip end of the respective inner cylindrical portions 17,18. The squib 8 faces to an enhancer 29 in the housing space S1. The enhancer 29 is positioned in the upper lid portion 12 side of the upper case 10, and is housed at state of closing the respective squib holes 17a. The respective squibs 8, 9 are ignited based on a collision detection signal from a collision sensor.

Thus, the squib 8 in the long inner cylindrical portion 17 is positioned on the axis a of the housing 1, and ignites the enhancer 29, and causes the firing flame of the enhancer 29 to spout into the upper combustion chamber 3 through the respective squib holes 17a. The squib 9 in the short inner cylindrical portion 18 projects into the lower combustion chamber 4 in a position eccentric to the axis a of the housing 1 and is close to the circumferential part 6 of the inner cylindrical member 2.

Next, actuation of the gas generator X1 will be described.

If the collision sensor detects a collision of the automobile, the enhancer 29 is fired by actuating the squib 8 only. The firing flame of the enhancer 29 spouts in radial directions in the upper combustion chamber 3 from the respective squib holes 17a throughout the circumferential direction of the housing 1. By uniformly burning the gas generating agents 6 with this flame, a high-temperature gas is generated. At this time, transfer of heat of combustion generated in the upper combustion chamber 3 is suppressed (slowed) by the heat insulating function of the cushion member 25 and simultaneous firing of the gas generating agents 6 in the lower combustion chamber 4 is prevented.

The high-temperature gas generated in the upper combustion chamber 3 flows throughout the circumferential direction of the housing 1 and into the filter member 7, is subjected to slag collection and cooling, and flows through the respective gas passing holes 2a of the inner cylindrical member 2 out into the gas passing space S2. When combustion in the upper combustion chamber 3 advances and pressure in the housing 1 reaches a predetermined value, the burst plate 21 bursts and a clean gas which is made uniform in the gas passing space S2 is discharged from the respective gas discharge ports 15a into an air bag. As a result, the air bag starts slow deployment and inflation with a small amount of clean gas generated in only the upper combustion chamber 3.

Then, if the squib 9 is actuated after a short interval from a start of combustion in the upper combustion chamber 3, the gas generating agents 6 in the lower combustion chamber 4 are forcibly fired, a combustion is started, and a high-temperature gas is generated. The combustion in the combustion chamber 4 is started with a state that the gas generating agents 6 around the squib 9 are burned locally. The combustion moves to the circumferential direction of the housing 1, and shifts to overall combustion as the time is passed. Therefore, in an initial stage of combustion in the lower combustion chamber 4, the high-temperature gas generated around the squib 9 flows into the filter member 7 from a near portion of the squib 9. When the high-temperature gas is flowed into the filter member 7, an amount of the gas that is flowed into the gas passing space S2 is restricted by the circumferential part δ of the inner cylindrical member 2, so that most gas which has flowed in the filter member 7 flows in a circumferential direction of the filter member 7. This is because most high-temperature gas which has flowed into the filter member 7 collides with an periphery inside of the inner cylindrical member 2 and changes a flow of the gas by the number of the gas passing holes 2a formed in the circumferential part of the inner cylindrical member 2 is small. As a result, even if the combustion locally around the squib 9 is caused in the initial stage of the combustion, it is possible to distribute the high-temperature gas to the circumferential direction of the filter member 2 and to cause the clean gas to flow evenly into the gas passing space S2.

The clean gas that generated in the lower combustion chamber 4 and that is flowed into the gas passing space S2 is evenly discharged around the outer cylindrical portion 15 from the respective gas discharge ports 15a. Thus, the air bag shifts to rapid deployment and inflation by a large amount of clean gas discharged from both the combustion chambers 3, 4. As a result, in the initial stage of inflation, the air bag starts slow deployment and inflation by the small amount of gas generated in only the upper combustion chamber 3. Thereafter, if a short time elapses since the initial stage of deployment and inflation, the air bag shifts to rapid-moving deployment and inflation by the large amount of gas that generated in both the combustion chambers 3, 4. The airbag is inflated evenly and smoothly with the clean gas that evenly discharged from the respective gas discharge ports 15a around the outer cylindrical portion 15.

When combustion in the upper combustion chamber 3 starts, a part of the high-temperature gas flows into the lower combustion chamber 4 through the gas passing space S2 and the like. Because the high-temperature gas flowing into the lower combustion chamber 4 is cooled while passing the inner cylindrical member 2 and the filter member 7 on the lower combustion chamber 4 side from the gas passing space S2 in the initial stage when the combustion starts, the gas does not cause spontaneous firing of the gas generating agents 6 in the lower combustion chamber 4. However, when combustion in the upper combustion chamber 3 advances to increase a temperature of the filter member 7 in the lower combustion chamber 4, the gas eventually causes spontaneous firing of the gas generating agents 6 in the lower combustion chamber 4. Therefore, in order to forcibly fire the gas generating agents 6 in the respective combustion chambers 3, 4 by the respective squibs 8, 9 at a short interval, it is necessary to retard timing of spontaneous firing of the gas generating agents 6 in the lower combustion chamber 4 by a time period longer than the short interval by a heat quantity of the high-temperature gas flowing into the lower combustion chamber 4.

Actuation of the respective squibs 8, 9 is not necessarily required to be carried out at the short interval and actuation of the respective squibs 8, 9 may be properly selected according to a form of the collision of the automobile.

For example, in highly dangerous collision such as a head-on collision and a diagonal frontal collision at a high speed, the respective squibs 8, 9 are actuated simultaneously to rapidly expand and inflate the air bag with the large amount of gas generated in both the combustion chambers 3, 4. In a moderately dangerous collision, the respective squibs 8, 9 are actuated at the short interval to slowly expand and inflate the air bag with the small amount of gas in the initial stage of inflation and then to rapidly expand and inflate the air bag with the large amount of gas after the short interval. In a less dangerous collision, by actuating the only one squib 8, the gas generating agents 6 in the upper combustion chamber 3 are fired forcibly. Thus, the air bag takes relatively much time to slowly expand and inflate with the small amount of gas.

As described above, according to the gas generator X1, by actuating the respective squibs 8, 9 at the short interval, it is possible to carry out inflation control such that the air bag is slowly inflated with the small amount of gas generated in only the upper combustion chamber 3 in the initial stage of inflation of the air bag and then is rapidly inflated with the large amount of gas generated in both the combustion chambers 3, 4 (the amount of gas discharged into the air bag can be controlled in two steps).

According to the gas generator X1, because the gas discharged from the respective gas discharge ports 15a around the outer cylindrical portion 15 can be made uniform, it is possible to uniformly and smoothly expand and inflate the air bag even if the respective squibs 8, 9 are disposed eccentrically to the axis a of the housing 1 so as to control inflation of the air bag.

Therefore, even if a passenger in the driver's seat is seated near a steering wheel, the passenger does not receive an impact caused by rapid deployment and inflation of the air bag in the initial stage of inflation or by uneven deployment and inflation of the air bag, as a result of this an inherent function of the air bag can be performed in safety.

Although the gas generator X1 has function that the gas is evenly discharged from the respective gas discharge ports 15a around the outer cylindrical portion 15 by adjusting the number of gas passing holes 2a formed in the inner cylindrical member 2, it is also possible to obtain the same function by adjusting opening areas of the respective gas passing holes 2a. If the number or the opening areas of the gas passing holes 2a formed in the circumferential part $\epsilon$ of the inner cylindrical member 2 is (are) increased as a distance from the squib 9 increases, it is possible to reliably distribute the gas in the combustion initial stage throughout the circumferential direction of the housing 1.

Next, a gas generator X2 shown in FIGS. 5 and 6 will be described.

Figure 5:
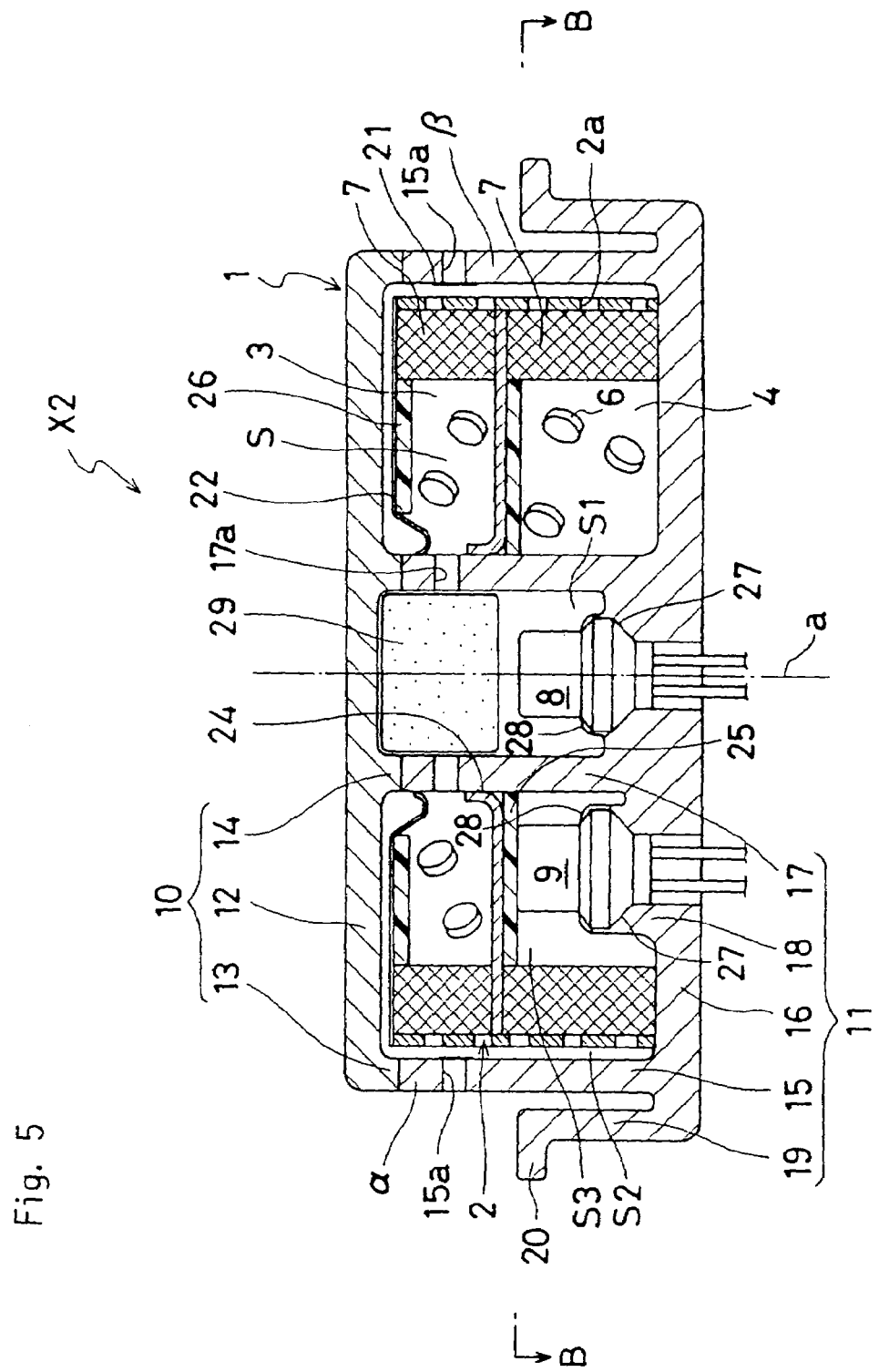
FIG. 5 is a sectional view showing a gas generator used for the air bag for the driver's seat according to a first modification.
Figure 6:
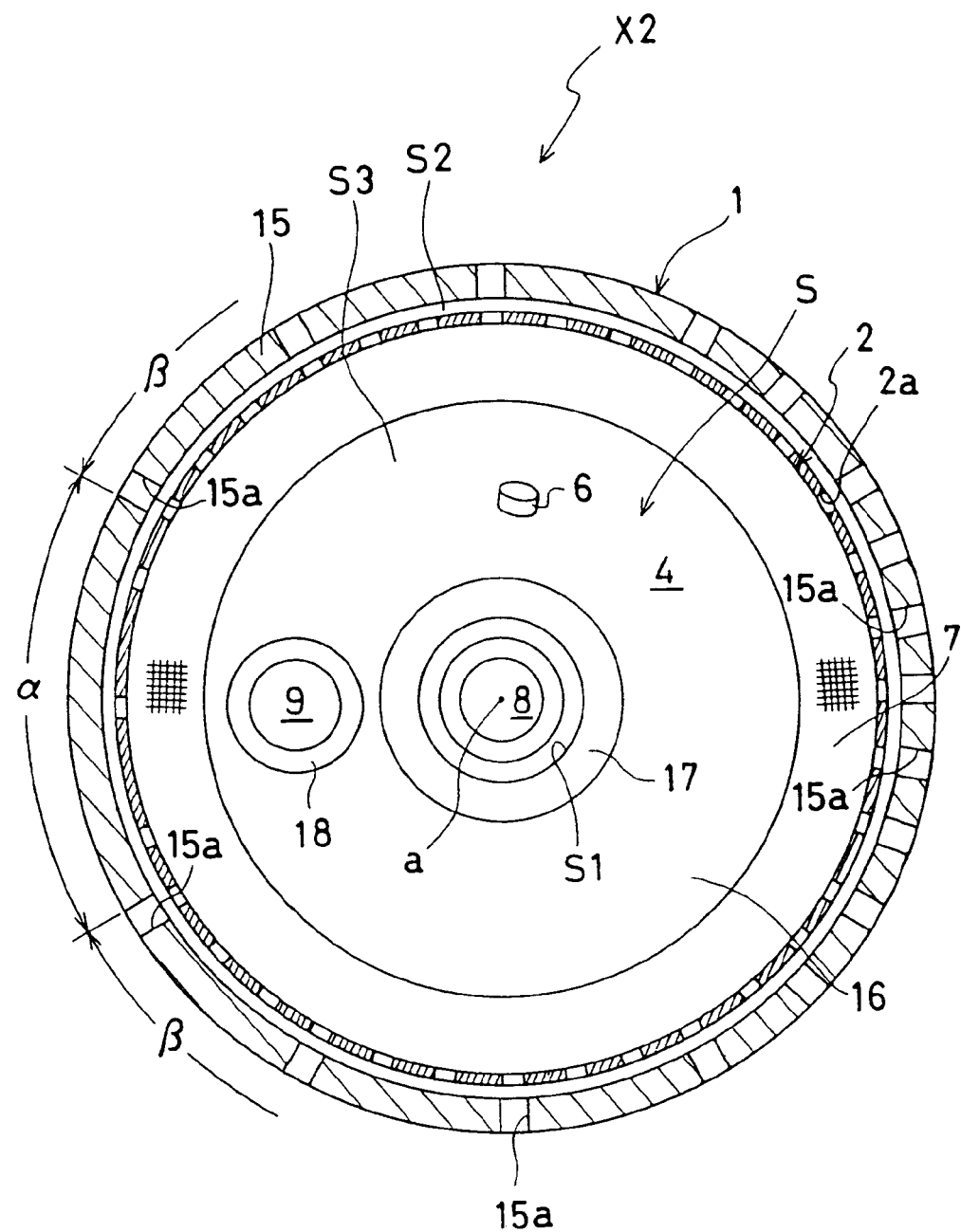
FIG. 6 is a sectional view taken along a line B—B in FIG. 5.

In the gas generator X2 in FIGS. 5 and 6, the deployment process of the air bag can be controlled and the clean gas can be evenly discharged from the respective gas discharge ports 15a around the outer cylindrical portion 15 by structures of the respective gas discharge ports 15a in the outer cylindrical portion 15. In FIGS. 5 and 6, the same members as those in FIGS. 1 and 2 are provided with the same reference numerals to avoid repetition of description.

In FIGS. 5 and 6, the number of respective gas discharge ports 15a formed in a circumferential part $\alpha$ of the outer cylindrical portion 15 closest to the squib 9 in the short inner cylindrical portion 18 is smaller than that in a circumferential part $\beta$ of the outer cylindrical portion 15 at a distance from the squib 9. The number of gas discharge ports 15a formed in the circumferential part $\beta$ of the outer cylindrical portion 15 is increased as a distance from the squib 9 increases and the number of gas discharge ports 15a is the largest in the part facing the short inner cylindrical portion 18 through the long inner cylindrical portion 17. As a result, permeability of gas through the respective gas discharge ports 15a in the outer cylindrical portion 15 is lower in the circumferential part $\alpha$ close to the squib 9 in the short inner cylindrical portion 18 than that in the other circumferential part $\beta$. The inner cylindrical member 2 uniformly formed with the gas passing holes 2a at predetermined intervals in its axial and circumferential directions is used.

Next, actuation of the gas generator X2 will be described.

If the collision sensor detects a collision of the automobile and only the squib 8 is actuated, the high-temperature gas generated in the upper combustion chamber 3 is subjected to slag collection and cooling in the filter member 7 and made uniform in the gas passing space S2 and then starts to be discharged into the air bag similarly to FIG. 1. The air bag starts slow deployment and inflation with the small amount of clean gas generated in only the upper combustion chamber 3.

Then, if the squib 9 is actuated after a short interval from a start of combustion in the upper combustion chamber 3, a combustion of the gas generating agents 6 in the lower combustion chamber 4 starts, and the air bag shifts to rapid deployment and inflation by the large amount of clean gas discharged from both the combustion chambers 3, 4 similarly to FIG. 1.

At this time, the high-temperature gas generated around the squib 9 in the lower combustion chamber 4 passes through the filter member 7 and the inner cylindrical member 2 from the portion close to the squib 9, is subjected to slag collection and cooling in the filter member 7 and the inner cylindrical member 2, and flows out into the gas passing space S2. The clean gas which has flowed out into the gas passing space S2 is once collided with the inner periphery of the outer cylindrical portion 15, a flowing direction of the gas is changed to the axial or circumferential direction of the gas passing space S2, and the gas is flowed toward the respective gas discharge ports 15a in the outer cylindrical portion 15. Because the number of gas discharge ports 15a formed in the circumferential part a of the outer cylindrical portion 15 is small, the amount of gas discharged from the circumferential part a into the air bag is restricted and distributed to the circumferential direction of the gas passing space S2. As a result, even if the combustion is locally generated around the squib 9 in the initial stage of the combustion in the lower combustion chamber 4, it is possible to make the gas discharged from the respective gas discharge ports 15a around the outer cylindrical portion 15 uniform by the number of gas discharge ports 15a formed in the outer cylindrical portion 15.

In the gas generator X2, similarly to the gas generator X1 in FIG. 1, the air bag can be inflated according to the form of the collision of the automobile by properly selecting the short interval between actuation of the respective squibs 8, 9. It is also possible that the permeability of the gas through the circumferential part a is lower than that through the other circumferential part $\beta$ by adjusting open areas of the respective gas discharge ports 15a without depending on the number of the formed holes 15a.

As described above, according to the gas generator X2, because control of inflation of the air bag can be easily carried out and the air bag can be inflated uniformly and smoothly similarly to FIG. 1, the inherent function of the air bag can be performed in safety.

Next, a gas generator X3 shown in FIGS. 7 and 8 will be described.

Figure 7:
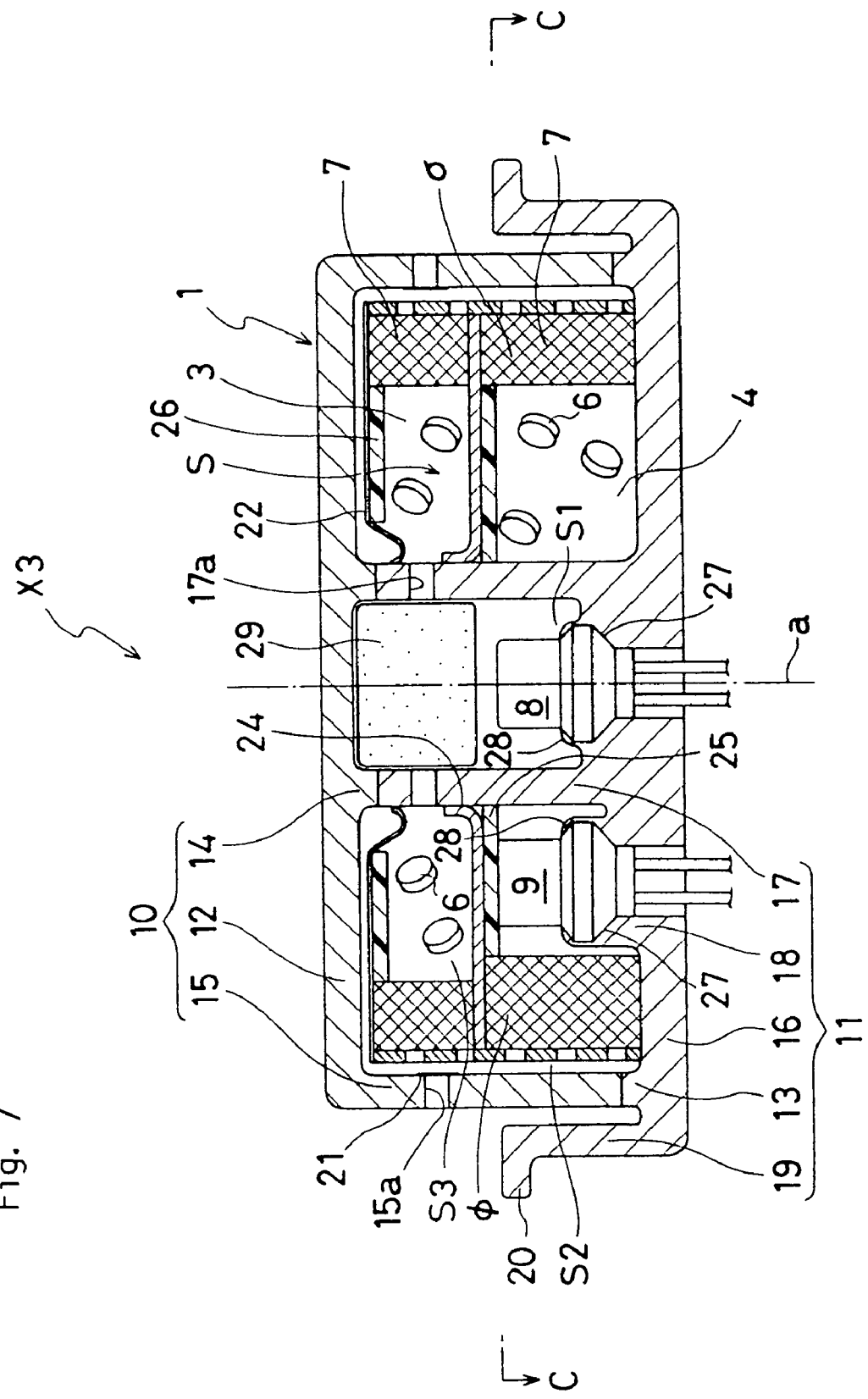
FIG. 7 is a sectional view of a gas generator used for the air bag for the driver's seat according to a second modification.
Figure 8:
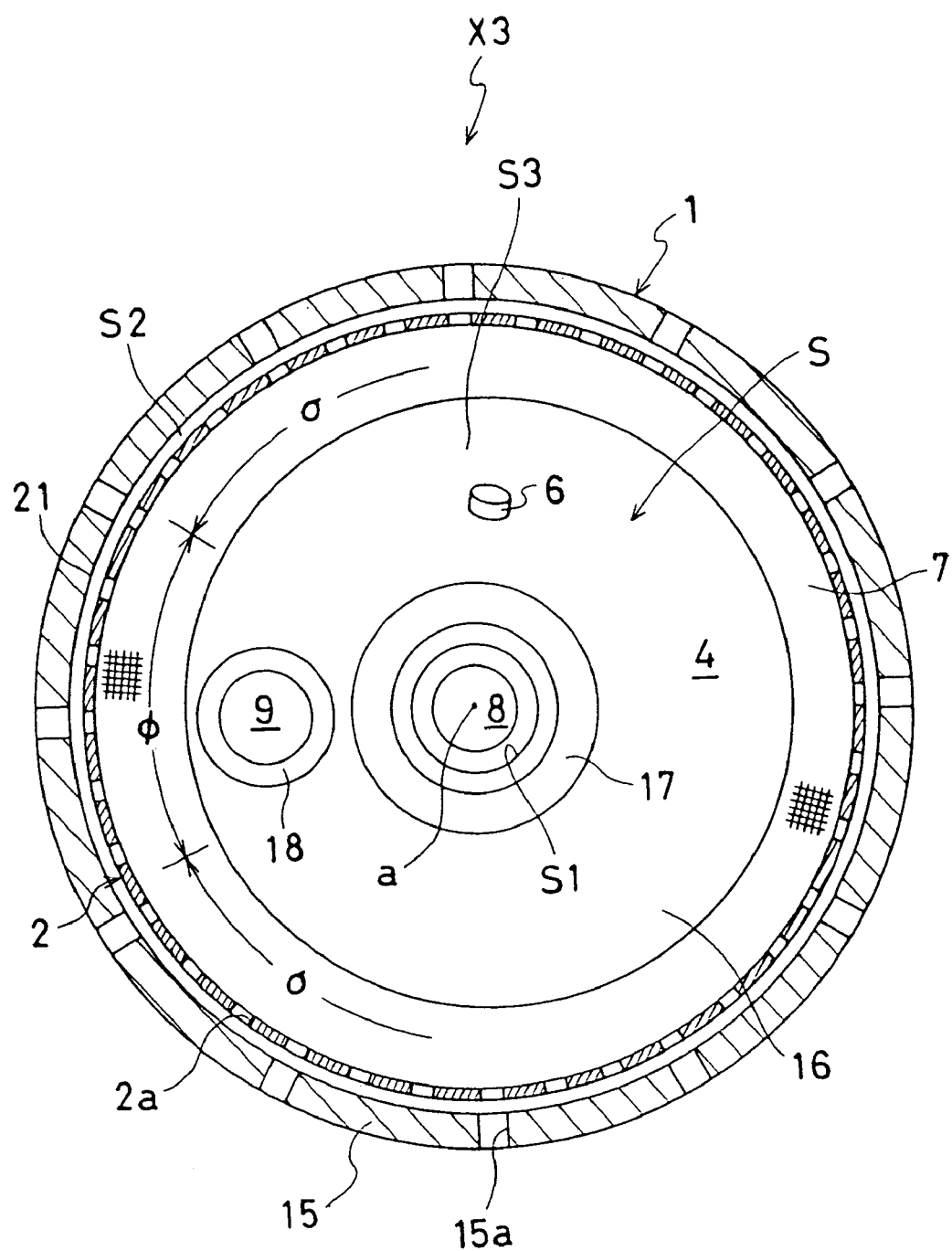
FIG. 8 is a sectional view taken along a line C—C in FIG. 7.

In the gas generator X3 in FIGS. 7 and 8, the deployment process of the air bag can be controlled and the clean gas can be evenly discharged from the respective gas discharge ports 15a around the outer cylindrical portion 15 by a structure of the filter member 7. In FIGS. 7 and 8, the same members as those in FIGS. 1 and 2 are provided with the same reference numerals to avoid repetition of description.

In FIGS. 7 and 8, the filter member 7 has a structure of which permeability of the gas in the lower combustion chamber 4 is varied in the circumferential direction of the housing 1. The filter member 7 has a structure of which the passing of gas through the circumferential part φ closest to the squib 9 in the short inner cylindrical portion 18 is harder than passing through the circumferential part σ at a distance from the squib 9. The circumferential part σ in the filter member 7 has structures of which the permeability of the gas increases as a distance from the squib 9 increases, and that the permeability is the highest in the part facing the short inner cylindrical portion 18 through the long inner cylindrical portion 17.

As the structure of the filter member 7, a structure in which a rate of voids (hereafter referred to as a void rate) formed by wire netting of stockinet or crimp-woven metal wire (see FIG. 4) is made uniform and the number of layers of the wire netting or the metal wire is increased such that a radial thickness of the circumferential part φ is larger than that of the part σ and that an inside diameter at the circumferential part φ is smaller, a structure in which the radial thickness of the filter member 7 is made uniform and the wire netting or the metal wire is gathered densely such that the void rate in the circumferential part φ is smaller than that in the part σ, or the like is employed. As a result, in the filter member 7, the permeability of the gas through the circumferential part φ close to the squib 9 in the short inner cylindrical portion 18 on the lower combustion chamber 4 side is lower than that through the other part σ.

The housing 1 is formed by integrally molding the outer cylindrical portion 15 with the upper lid portion 12 of the upper case 10 concentrically with the inner cylindrical projecting portion 14 and is formed into the structure of double cylindrical portions in which upper and lower end portions of the outer cylindrical portion 15 and the long inner cylindrical portion 17 are closed with the respective lids 12 and 16 by butting an upper end of the outer cylindrical portion 15 of the upper case 10 against an upper end of the outer cylindrical projecting portion 13 of the lower lid portion 17, butting a lower end of the inner cylindrical projecting portion 14 against an upper end of the long inner cylindrical portion 17, and joining the respective lower ends and the upper ends to each other by welding (e.g., friction welding). The inner cylindrical member 2 evenly formed with the gas passing holes 2a at predetermined intervals in its axial and circumferential directions is used.

Next, actuation of the gas generator X3 will be described.

If the collision sensor detects a collision of the automobile and only the squib 8 is actuated, the high-temperature gas generated in the upper combustion chamber 3 is subjected to slag collection and cooling in the filter member 7 and made uniform in the gas passing space S2 and then starts to be discharged into the air bag similarly to FIG. 1. The air bag starts slow deployment and inflation by the small amount of clean gas generated in only upper combustion chamber 3.

Then, if the squib 9 is actuated after a short interval from a start of combustion in the upper combustion chamber 3, combustion of the gas generating agents 6 in the lower combustion chamber 4 starts and the air bag shifts to rapid deployment and inflation with the large amount of clean gas discharged from both the combustion chambers 3 and 4 similarly to FIG. 1.

At this time, the high-temperature gas generated around the squib 9 in the lower combustion chamber 4 flows into the filter member 7 from the circumferential part φ close to the squib 9. Because the filter member 7 has a structure of which the passing of gas through the circumferential part φ is harder than passing through the part σ, a greater part of the high-temperature gas which cannot flow in from the circumferential part φ of the filter member 7 flows in the circumferential direction away from the squib 9. Then, the high-temperature gas successively flows in from the circumferential part σ of the filter member 7 while flowing away from the squib 9. A surplus of high-temperature gas which cannot flow in flows in from the circumferential part σ at a greater distance from the squib 9. As a result, even if a combustion is generated locally around the squib 9 in the initial stage of the combustion in the lower combustion chamber 4, it is possible to distribute the high-temperature gas in the circumferential direction of the housing 1 by the structure of the filter member 7. Therefore, it is possible to made the gas discharge from the respective gas discharge ports 15a through the gas passing space S2 around the outer cylindrical portion 15 uniform.

In the gas generator X3, similarly to the gas generator X1 in FIG. 1, the air bag can be inflated according to the form of the collision of the automobile by properly selecting the short interval between actuation of the respective squibs 8, 9.

As described above, according to the gas generator X3, because control of inflation of the air bag can be easily carried out and the air bag can be inflated uniformly and smoothly similarly to FIG. 1, the inherent function of the air bag can be performed in safety.

Figure 9:
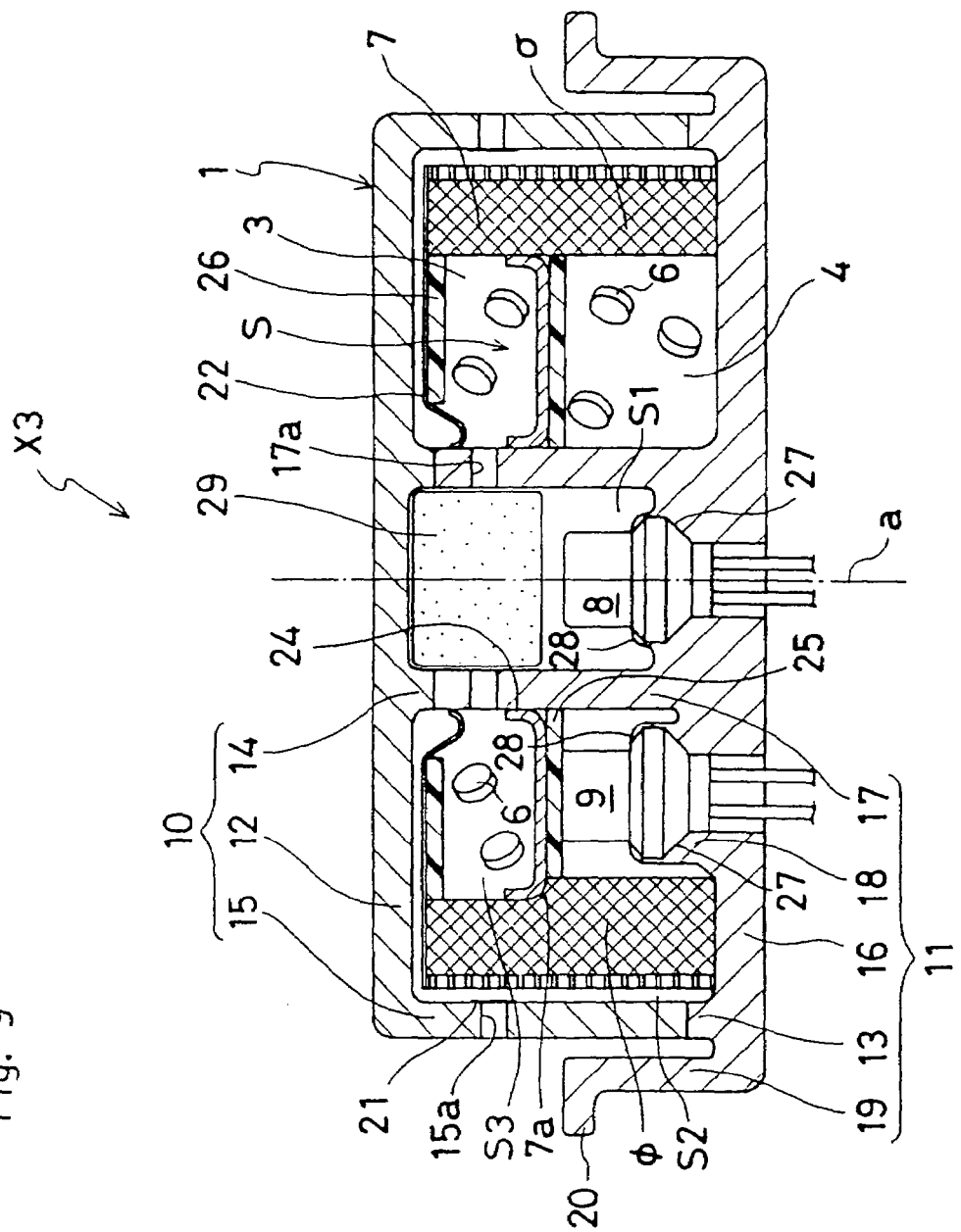
FIG. 9 is a sectional view of a gas generator used for the air bag for the driver's seat according to a third modification.

In the gas generator X3 in FIGS. 7 and 8, although the filter members 7 are respectively disposed in the respective combustion chambers 3, 4, it is also possible to integrally mold the filter member 7 in the respective combustion chambers 3, 4 as shown in FIG. 9.

In FIG. 9, the filter member 7 is mounted in the inner cylindrical member 2 to extend from the lower lid portion 16 to the lid member 21 and has a step 7a projecting inward in a radial direction above the squib 9 on the side of the circumferential part φ of the filter member 7. Thus, the filter member 7 and the inner cylindrical member 2 partition the airtight space S into the gas passing space S2 and the combustion space S3. The combustion space S3 is partitioned into the upper and lower two combustion chambers 3, 4 by the partition member 5 mounted in the filter member 7. The partition member 5 is positioned to face the squib 9 at an upper portion of the squib 9 in the short inner cylindrical portion 18 by bringing an outer circumferential edge of the partition member 5 into contact with the step 7a of the filter member 7. In the respective combustion chambers 3, 4, the gas generating agents 6 are loaded.

As described above, in the case that the filter member 7 in the respective combustion chambers 3, 4 is integrally molded, it is possible to reduce the number of parts and manufacturing costs as compared with the filter members 7 respectively disposed in the respective combustion chambers 3 and 4. Even if a combustion generated locally around the squib 9 in the initial stage of the combustion in the lower combustion chamber 4, it is possible to distribute the high-temperature gas in the circumferential direction of the housing 1 by the structure of the filter member 7. Therefore, it is possible to make the gas passing through the gas passing space S2 and discharged from the respective gas discharge ports 15a around the outer cylindrical portion 15 uniform.

Next, a gas generator X4 shown in FIGS. 10 and 11 will be described.

Figure 10:
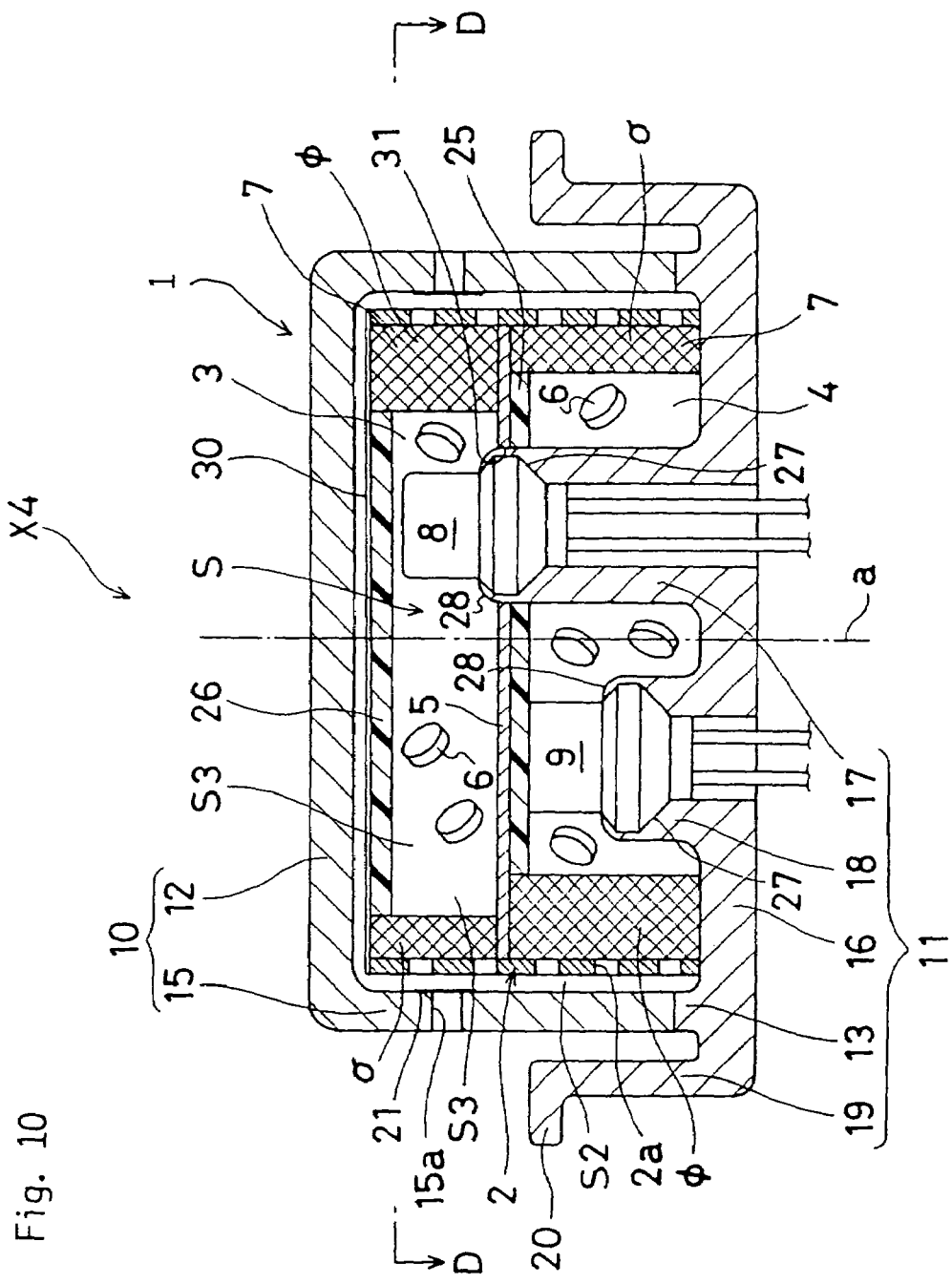
FIG. 10 is a sectional view of a gas generator used for the air bag for the driver's seat according to a fourth modification.
Figure 11:
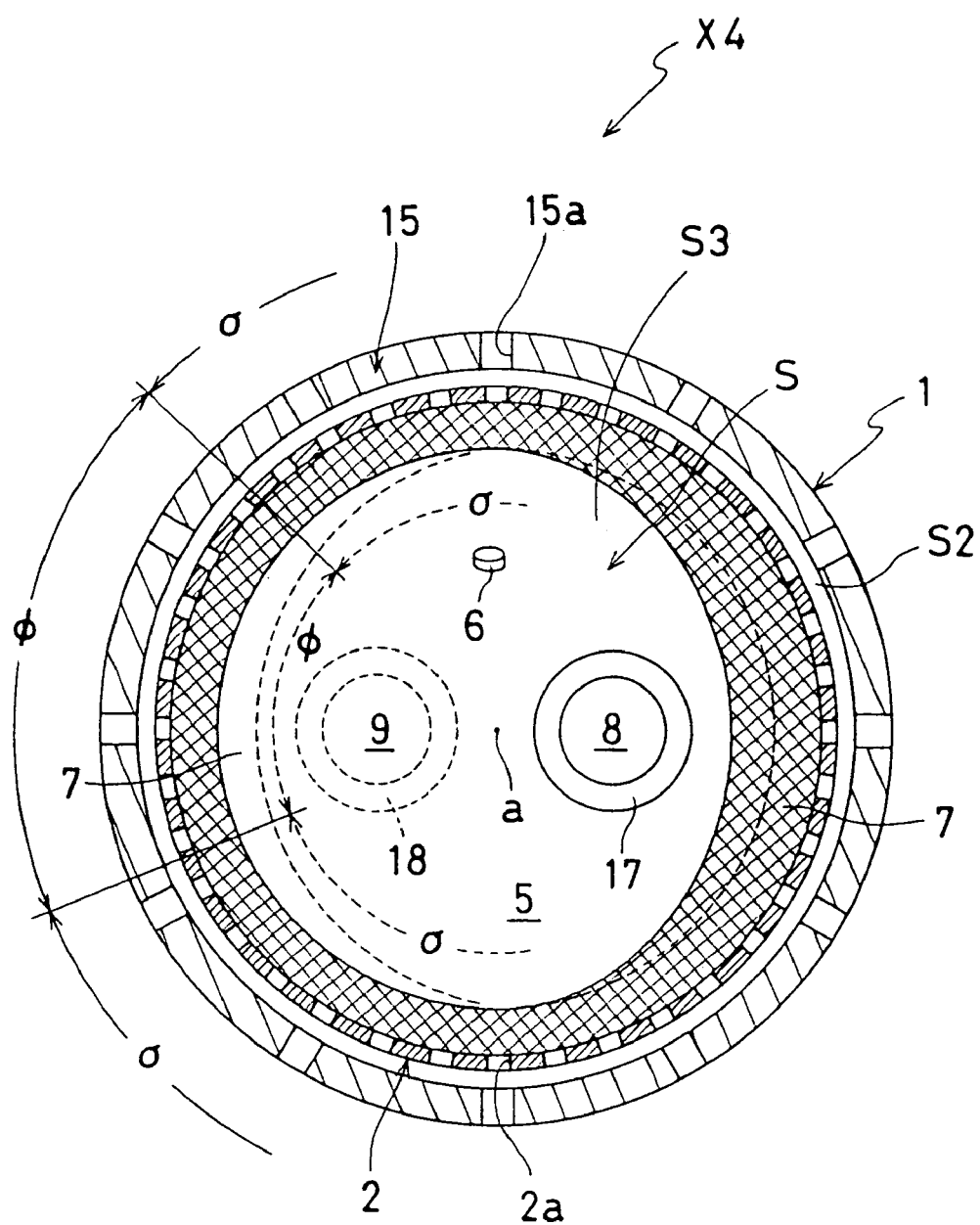
FIG. 11 is a sectional view taken along a line D—D in FIG. 10.

In the gas generator X4 in FIGS. 10 and 11, the housing 1 is formed into a structure of a single cylindrical portion and the respective squibs 8, 9 are disposed eccentrically to the axis a of the housing 1. In the gas generator X4, the deployment process of the air bag can be controlled and the clean gas can be evenly discharged from the respective gas discharge ports 15a around the outer cylindrical portion 15 by a structure of the filter member 7. In FIGS. 10 and 11, the same members as those in FIGS. 1 and 2 are provided with the same reference numerals to avoid repetition of description.

In FIGS. 10 and 11, the housing 1 is a single cylindrical structure in which the airtight space S is formed inside by the upper case 10 and the lower case 11. The upper case 10 has the outer cylindrical portion 15 and the upper lid portion 12 for closing the upper end portion of the outer cylindrical portion 15, and the outer cylindrical portion 15 and the upper lid portion 12 are integrally molded with an aluminum alloy or the like. The lower case 11 has a lower lid portion 16, a outer cylindrical projecting portion 13 projected from the outer circumferential side of the lower lid portion 16, and a flange cylindrical portion 19 extended along an radial outside of the outer cylindrical projecting portion 13 from a periphery of the outer circumferential edge of the lower lid portion 16. The lower lid portion 16, the outer cylindrical projecting portion 13, and the flange cylindrical portion 19 are integrally molded with the aluminum alloy or the like.

The long inner cylindrical portion 17 and the short inner cylindrical portion 18 are integrally molded to the lower lid portion 16 so as to be projected toward the outer cylindrical portion 15, and are disposed eccentrically outward in the radial direction to the axis a of the housing 1. The inner cylindrical portions 17 and 18 are symmetrical with the axis a of the housing 1. The long inner cylindrical portion 17 is projected to be slightly shorter than the outer cylindrical portion 15. The short inner cylindrical portion 18 is projected to be shorter than the long inner cylindrical portion 17.

The housing 1 is a single cylindrical structure in which the upper and lower end portions of the outer cylindrical portion 15 are closed with the respective lids 12, 16 by butting the lower end of the outer cylindrical portion 15 of the upper case 10 against the upper end of the outer cylindrical projecting portion 13 and joining the lower end and the upper end to each other by welding (e.g., friction welding). As a result, the airtight space S is formed in the housing 1.

The airtight space S in the housing 1 is partitioned into the annular gas passing space S2 and the combustion chamber S3 by the inner cylindrical member 2 that is located between the respective inner cylindrical portions 17, 18 and the outer cylindrical portion 15. The annular gas passing space S2 is located between an outer periphery of the inner 1 cylindrical member 2 and an inner periphery of the outer cylindrical portion 15, and the combustion chamber S3 is located inside the inner cylindrical member 2. The inner cylindrical member 2 is extended from the lower lid portion 16 to the vicinity of the upper lid portion 12 and an upper end portion of the inner cylindrical member 2 is closed with a lid member 30. The combustion space S3 in the inner cylindrical member 2 is partitioned into the upper and lower two combustion chambers 3, 4 by the partition member 5. The partition member 5 is mounted with substantially parallel to the upper lid portion 12 and the lower lid portion 16 in the inner cylindrical member 2 between these lid portions 12 and 16. The partition member 5 has a through hole 31 formed eccentrically to a central portion, and is positioned facing the short inner cylindrical portion 18 at an upper side thereof by fitting a through hole 31e on the long inner cylindrical portion 17. The long inner cylindrical portion 17 is passing through the lower combustion chamber 4 and the partition member 5 and projecting into the upper combustion chamber 3. On the other hand, the short inner cylindrical portion 18 is projecting into the lower combustion chamber 4. In each of the combustion chambers 3, 4, the gas generating agents 6 are loaded and the filter member 7 is mounted surrounding the gas generating agents 6.

The filter member 7 has a structure of which permeability of the gas in the lower combustion chamber 4 is varied in the circumferential direction of the housing 1. Specifically, the filter member 7 has a structure of which the passing of gas through the circumferential part φ closest to each inner cylindrical portion 17, 18 is harder than passing through the circumferential part σ at a distance from each inner cylindrical portion 17, 18. The circumferential part σ of each filter member 7 is formed so that the permeability of the gas is increased as a distance from each inner cylindrical portion 17, 18 gets longer. The filter member 7 is made to inside diameter smaller at the circumferential part φ by a structure member that the number of layers of the wire netting or the metal wire in the circumferential part φ is increased so that a radial thickness of the circumferential part φ is larger than that of the part σ. The filter member 7 may be made by a structure material that the wire netting or the metal wire is gathered densely at the circumferential part φ such that the void rate of the circumferential part φ is smaller than that of the part σ. As a result, in the respective filter members 7, the permeability of the gas through the circumferential part φ close to the respective inner cylindrical portions 17, 18 in the respective combustion chambers 3, 4 is lower than that through the other part σ.

The respective squibs 8, 9 are individually mounted and fixed by caulking in the respective inner cylindrical portions 17, 18. The squib 8 in the long inner cylindrical portion 17 is projected into the upper combustion chamber 3 and is located near the circumferential part σ of the filter member 7. On the other hand, the squib 9 in the short inner cylindrical portion 18 is projected into the lower combustion chamber 4 and is in contact with the cushion member 25 and is located near the circumferential part φ of the filter member 7.

Next, actuation of the gas generator X4 will be described.

If the collision sensor detects a collision of the automobile and only the squib 8 is actuated, the high-temperature gas generated in the upper combustion chamber 3 is subjected to slag collection and cooling in the filter member 7 and made uniform in the gas passing space S2 and then starts to be discharged into the air bag similarly to FIG. 1. The air bag starts slow deployment and inflation with the small amount of clean gas generated in only the upper combustion chamber 3.

At this time, the combustion in the upper combustion chamber 3 starts when the gas generating agents 6 around the squib 8 are burned locally. The combustion moves to the circumferential direction of the housing 1, and shifts to overall combustion as the time is passed. Therefore, the high-temperature gas generated around the squib 8 in an initial stage of combustion in the upper combustion chamber 3 flows into the filter member 7 from the circumferential part φ located near the squib 8. However, because the passing of gas through the circumferential part φ is harder than the passing of the part σ, a great amount of the high-temperature gas which cannot flow in from the circumferential part φ of the filter member 7 flows in the circumferential direction away from the squib 8. The high-temperature gas successively flows into through the circumferential part σ of the filter member 7 while flowing away from the squib 8. A surplus of the high-temperature gas which cannot flow flows into through the circumferential part σ with a great distance from the squib 8. As a result, in the initial stage of the combustion of the upper combustion chamber 3, even if the combustion is generated locally around the squib 8, it is possible to distribute the high-temperature gas in the circumferential direction of the housing 1 by the structure of the filter member 7. Therefore, it is possible to discharge uniformly the gas passed through the gas passing space S2 around the outer cylindrical portion 15 from the respective gas discharge ports 15a.

Then, if the squib 9 is actuated after a short interval from a start of combustion in the upper combustion chamber 3, a combustion of the gas generating agents 6 in the lower combustion chamber 4 starts, and the air bag shifts to rapid deployment and inflation by the large amount of clean gas discharged from both the combustion chambers 3, 4 similarly to FIG. 1.

At this time, the high-temperature gas generated around the squib 9 in the lower combustion chamber 4 is distributed in the circumferential direction of the housing 1 and flows into the filter member 7 by the structure of the filter member 7 similarly to the upper combustion chamber 3. As a result, even if the combustion is locally generated around the squib 9 in the initial stage of the combustion in the lower combustion chamber 4, it can discharge uniformly the gas passed through the gas passing space S2 around the outer cylindrical portion 15 from the respective gas discharge ports 15a.

In the gas generator X4, similarly to the gas generator X1 in FIG. 1, the air bag can be inflated according to the form of the collision of the automobile by properly selecting the short interval between actuation of the respective squibs 8, 9.

As described above, according to the gas generator X4, because control of inflation of the air bag can be easily carried out and the air bag can be inflated uniformly and smoothly similarly to FIG. 1, the inherent function of the air bag can be performed in safety.

In the gas generator X4, it is possible to employ a housing 1 made of stainless steel. The housing 1 is a single cylindrical structure by using the upper case 10 and lower case 11, and these cases 10, 11 are formed by pressing a stainless steel. The upper case 10 is made of forming integrally the upper lid portion 16 and the outer cylindrical portion 15 by pressing the stainless steel. The lower case 11 is made of forming integrally the lower lid portion 16 and the flange cylindrical portion 19 by pressing the stainless steel. As a result, the housing 1 has a structure with excellent property of heat resistance and pressure resistance as compared with the housing molded of the aluminum alloy or the like. The respective inner cylindrical portions 17, 18 are provided separately onto the lower lid portion 16 and are projected respectively into the respective combustion chambers 3, 4. The housing 1 made of stainless steel as described above has a excellent property of heat resistance and pressure resistance and it is possible to use a non-azide gas generating agent instead of an azide gas generating agent which has been used conventionally. The non-azide gas generating agent has a property that is generated easily a high-temperature and high-pressure gas as compared with the azide gas generating agent. Therefore, although the gas generator is required to have the housing 1 with the excellent property of heat resistance and pressure resistance if the non-azide gas generating agent is used, it can use easily the non-azide gas generating agent by employing the housing 1 of the single cylindrical structure made of the stainless sheet steel.

Next, a gas generator X5 shown in FIGS. 12 and 13 will be described.

Figure 12:
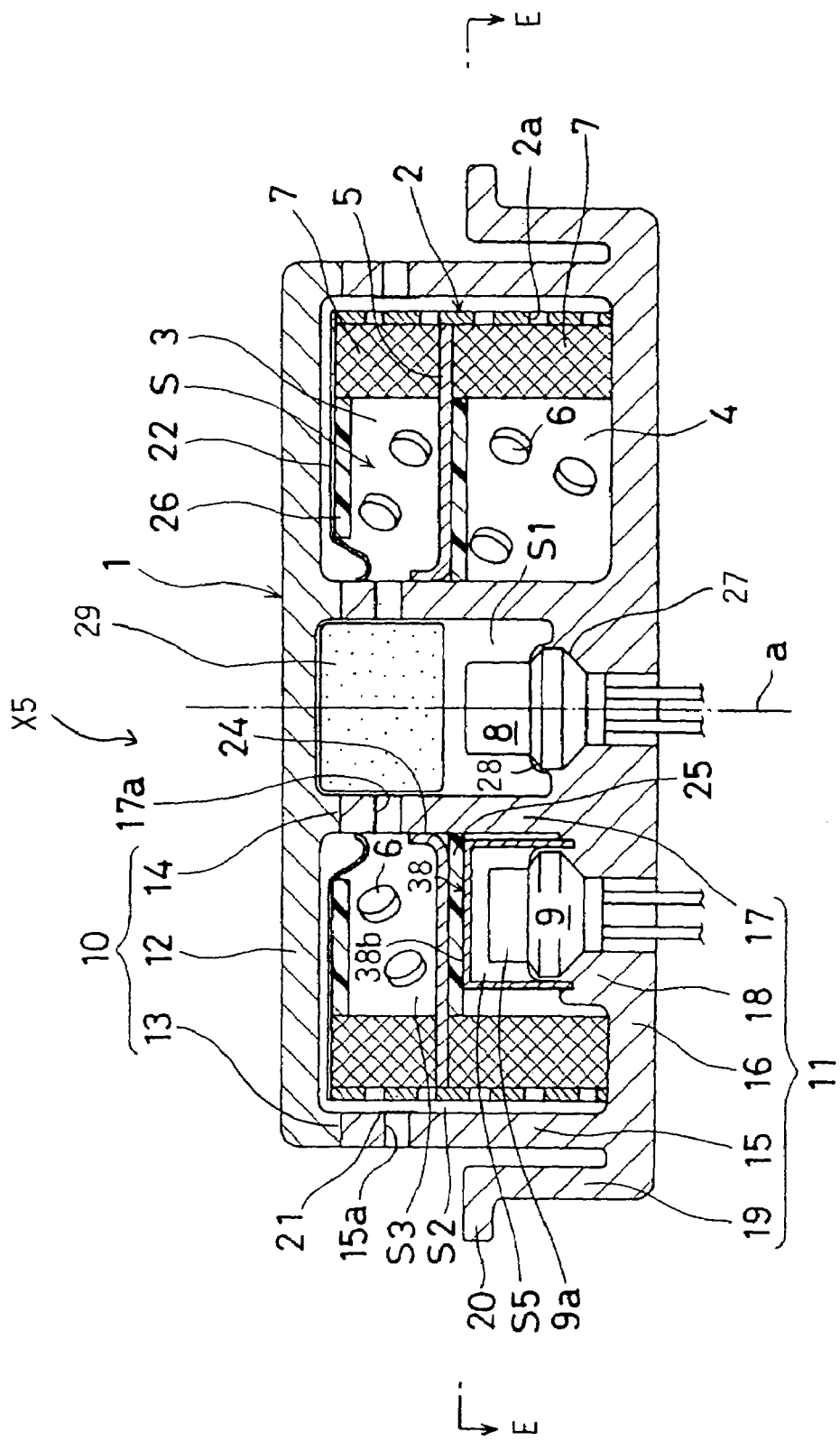
FIG. 12 is a sectional view of a gas generator used for the air bag for the driver's seat according to a fifth modification.
Figure 13:
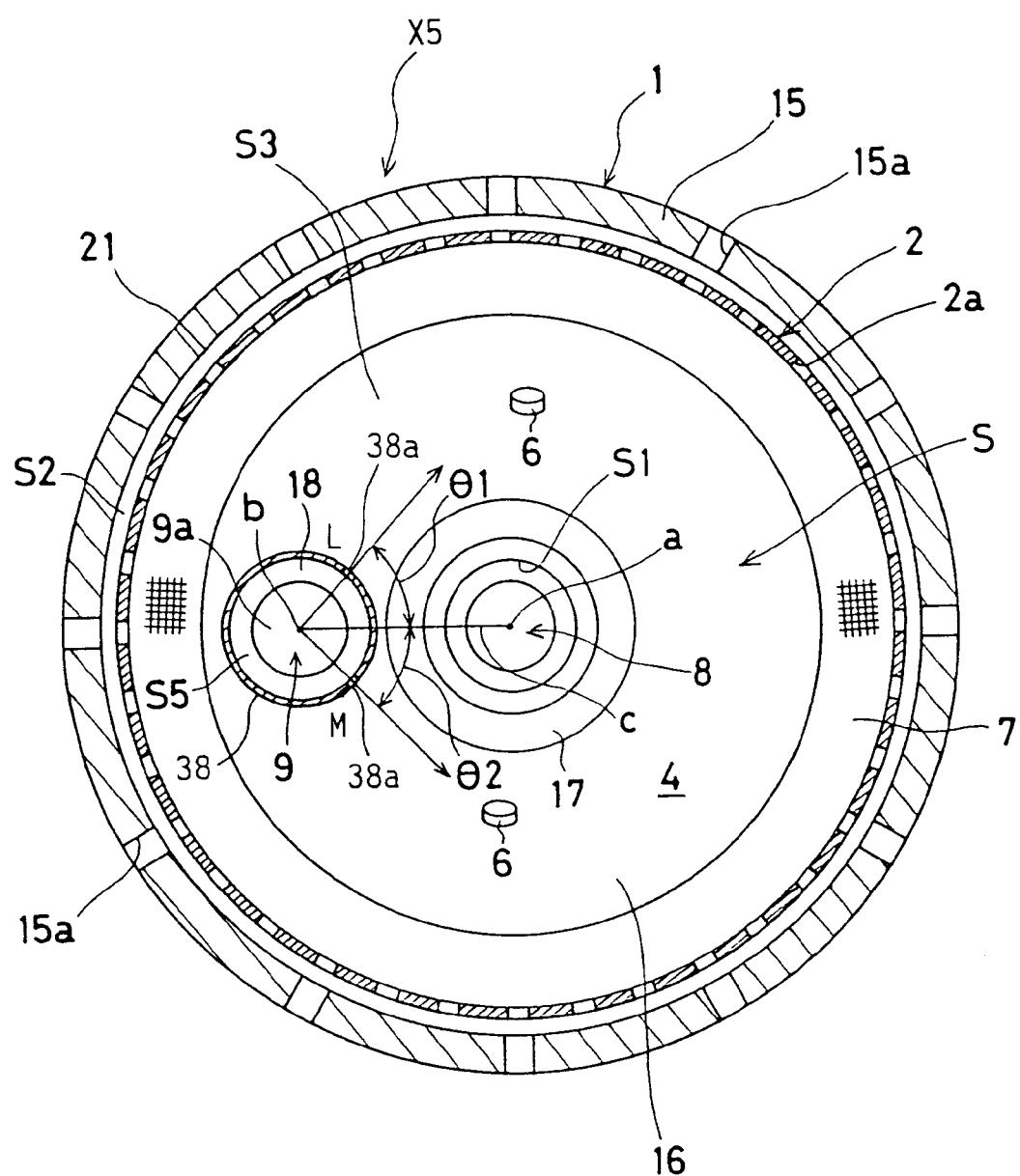
FIG. 13 is a sectional view taken along a line E—E in FIG. 12.

In the gas generator X5 in FIGS. 12 and 13, the deployment process of the air bag can be controlled and the clean gas can be evenly discharged from the respective gas discharge ports 15a by controlling a firing flame of the eccentric squib 9. The gas generator X5 has the housing 1 of the double cylindrical structure similar to that in FIGS. 1 and 2. And the same members as those in FIGS. 1 and 2 are provided with the same reference numerals to avoid repetition of description.

In FIGS. 12 and 13, the eccentric squib 9 is mounted in the short inner cylindrical portion 18, and its projected portion 9a is projected into the lower combustion chamber 4. The projected portion 9a of the squib 9 has a firing agent fired in response to the collision detection signal (electrical energy) from the collision sensor, and is covered with a cup-shaped firing lid 38 for controlling a spouting direction of the firing flame.

Figure 14:
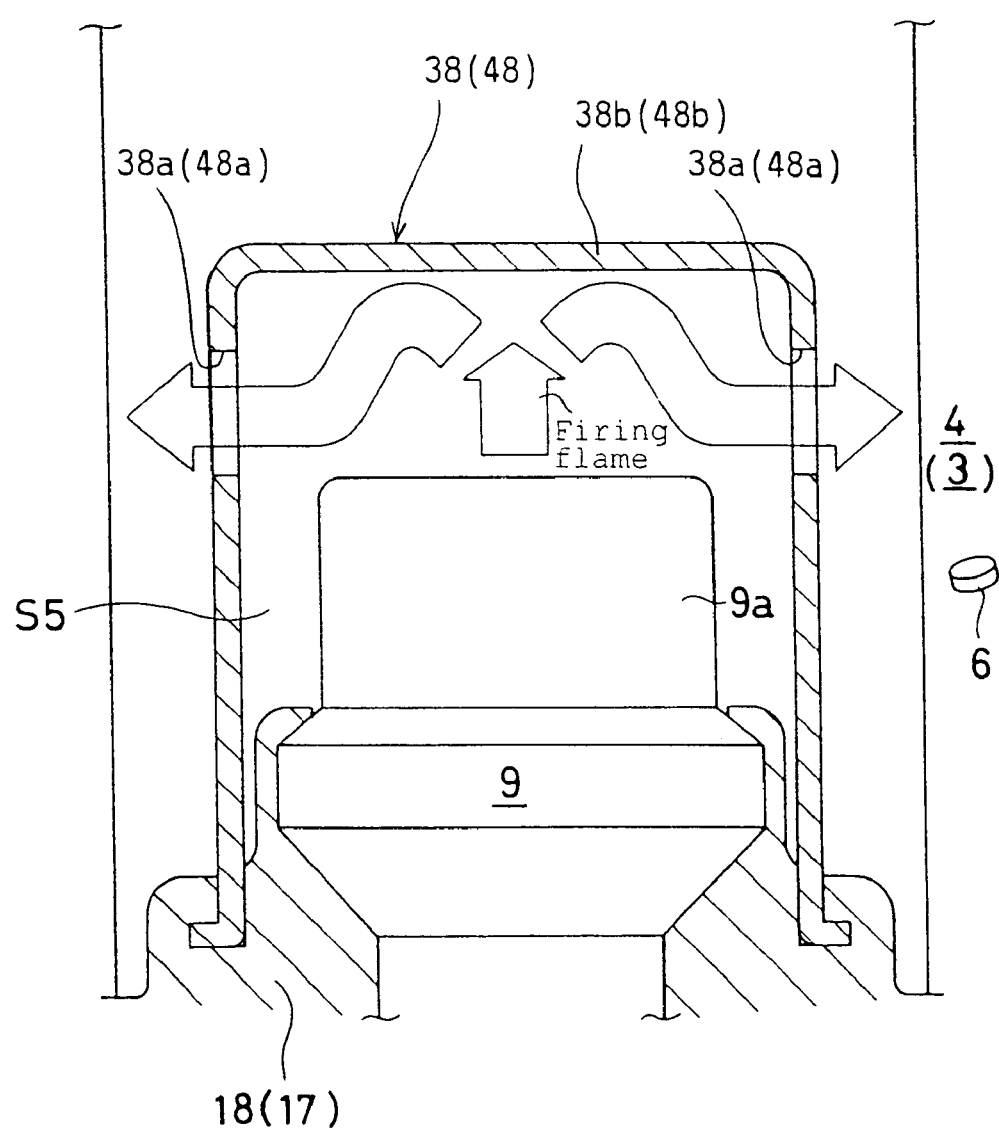
FIG. 14 is an enlarged sectional view of a structure of an eccentric igniter.
Figure 15:
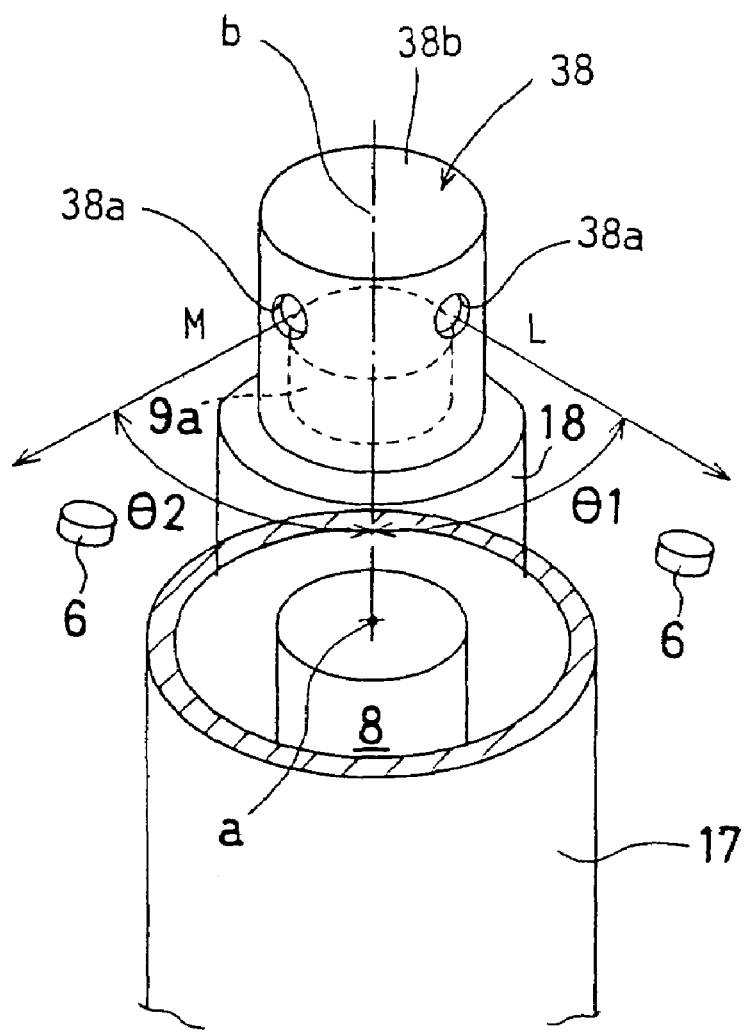
FIG. 15 is an enlarged perspective view of the igniter in FIG. 14.
Figure 16:
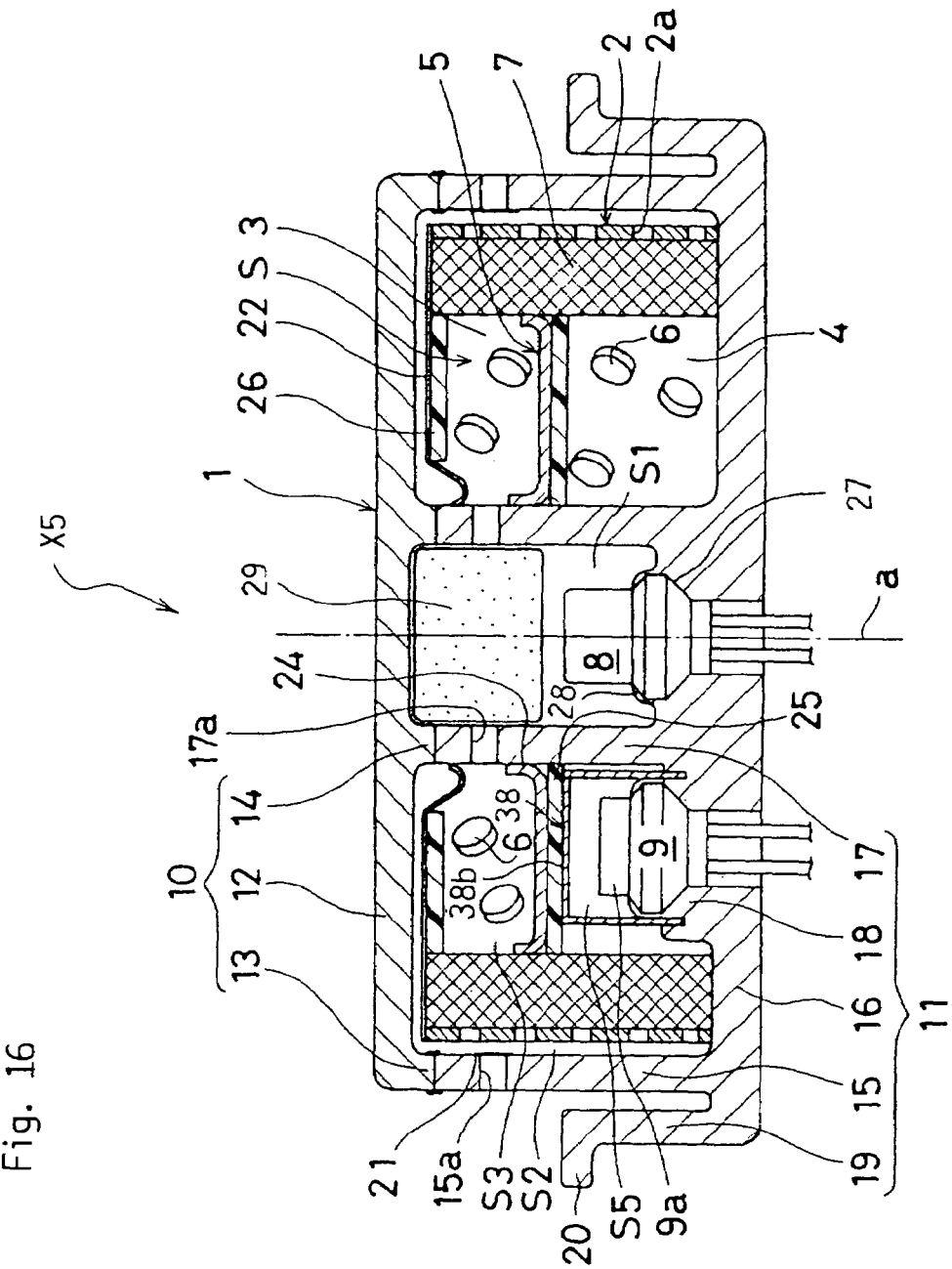
FIG. 16 is a sectional view of a gas generator used for the air bag for the driver's seat according to a sixth modification.

As shown also in FIG. 14, the firing lid 38 is fitted in the short inner cylindrical portion 18 and has two firing holes 38a for allowing the firing flame of the squib 9 to spout into the lower combustion chamber 4. A flame space S5 is formed between the firing lid 38 and the projected portion 9a. The respective firing holes 38a open into the flame space S5 above the projected portion 9a of the squib 9, and allow the firing flame or the like which collided with a cup bottom 38b of the firing lid 38 to spout into the lower combustion chamber 4 from the flame space S5 (see FIG. 14). The respective firing holes 38a are formed in two positions L and M on a side (the axis a side of the housing 1) facing the long inner cylindrical portion 17 on opposite sides of a straight line connecting axes a and b of the respective inner cylindrical portions 17, 18 as a boundary as shown in FIGS. 13 and 15. In other words, the firing holes 38a in the respective positions L and M open at angles q1 and q2 in opposite directions from the straight line c with respect to the axis b of the short inner cylindrical portion 18 such that the firing flame can spout between the long inner cylindrical portion 17 and the filter member 7 and around the long inner cylindrical portion 17 (the axis a of the housing 1) at a distance from the squib 9. Although the angles q1 and q2 are preferably equal to each other such that the firing flame of the squib 9 spouts evenly around the long inner cylindrical portion 17 (the axis a of the housing 1), the angles q1 and q2 are adjustable so as to uniformly burn all the gas generating agents 6.

As a result, the squib 9 causes its firing flame to intensively spout around the axis a of the housing 1 away from the squib 9 with the respective firing holes 38a in the firing lid 38 to fire and burn the gas generating agents 6 in the lower combustion chamber 4.

The inner cylindrical member 2 formed with the gas passing holes 2a at predetermined intervals in axial direction and circumferential direction is used.

Next, actuation of the gas generator X5 will be described.

If the collision sensor detects a collision of the automobile and only the squib 8 is actuated, the high-temperature gas generated in the upper combustion chamber 3 is subjected to slag collection and cooling in the filter member 7 and made uniform in the gas passing space S2 and then starts to be discharged into the air bag similarly as FIG. 1. The air bag starts slow deployment and inflation with the small amount of clean gas generated in only the upper combustion chamber 3.

Then, if the squib 9 is actuated after a short interval from a start of combustion in the upper combustion chamber 3, the firing flame of the squib 9 intensively spouts around the long inner cylindrical portion 17 away from the squib 9 through the respective firing holes 38a and burns the gas generating agents 6 to thereby generate the high-temperature gas. At this time, combustion in the combustion chamber 4 starts with the gas generating agents 6 in a large area in the vicinity of the squib 9 and around the long inner cylindrical portion 17 at a distance from the squib 9 and then instantaneously moves to the circumferential direction of the housing 1 to shift to overall combustion. Therefore, it is possible to avoid the uneven and local combustion in the vicinity of the squib 9 and to instantaneously shift the combustion to the overall combustion. As a result, it is possible to generate the high-temperature gas in the combustion chamber 4 evenly around the axis a of the housing 1.

Then, the high-temperature gas generated in the lower combustion chamber 4 flows throughout the circumferential direction of the housing 1 and into the filter member 7, is subjected to slag collection and cooling in the filter member 7, and uniformly flows into the gas passing space S2 from the respective gas passing holes 2a in the inner cylindrical member 2. Because the clean gas which has flowed into the gas passing space S2 evenly flows into the air bag from the respective gas discharge ports 15a in the outer cylindrical portion 15, the air bag shifts to rapid deployment and inflation with the large amount of clean gas discharged from both the combustion chambers 3, 4.

In the gas generator X5, similarly to the gas generator X1 in FIG. 1, the air bag can be inflated according to the form of the collision of the automobile by properly selecting the short interval between actuation of the respective squibs 8 and 9.

As described above, according to the gas generator X5, control of inflation of the air bag can be easily carried out similarly as FIG. 1.

In the gas generator X5, by controlling the firing flame of the eccentric squib 9 to instantaneously shift the combustion to the overall combustion around the axis a of the housing 1, it is possible to make the clean gas discharged from the respective gas discharge ports 15a into the air bag uniform. Therefore, it is possible to uniformly and smoothly expand and inflate the air bag.

Although the firing lid 38 formed with the two firing holes 38a has been described in the gas generator X5, three or more firing holes 38a may be formed. The respective firing holes 38a are disposed such that all the gas generating agents 6 are burned uniformly.

The gas generator X5 has a structure of which the inside of the inner cylindrical member 2 is partitioned into the upper and lower two combustion chambers 3, 4 with the partition member 5. And the gas generator X5 has a structure of which the gas generating agents 6 and the filter members 7 are disposed in the respective combustion chambers 3, 4. However, a structure shown in FIG. 16 can be adopted furthermore. In the gas generator X5 in FIG. 16, the combustion space S3 in the filter member 7 obtained by integrally molding the filter member 7 in the respective combustion chambers 3 and 4 and mounting the member 7 in the inner cylindrical member 2 is partitioned into the upper and lower two combustion chambers 3, 4 with the partition member 5. The gas generating agents 6 are loaded in the respective combustion chambers 3, 4. If the filter member 7 in the respective combustion chambers 3, 4 is integrally molded, it is possible to reduce the number of parts and manufacturing costs, as compared with the filter members 7 respectively disposed in the respective combustion chambers 3, 4.

Next, a gas generator X6 shown in FIGS. 17 and 18 will be described.

Figure 17:
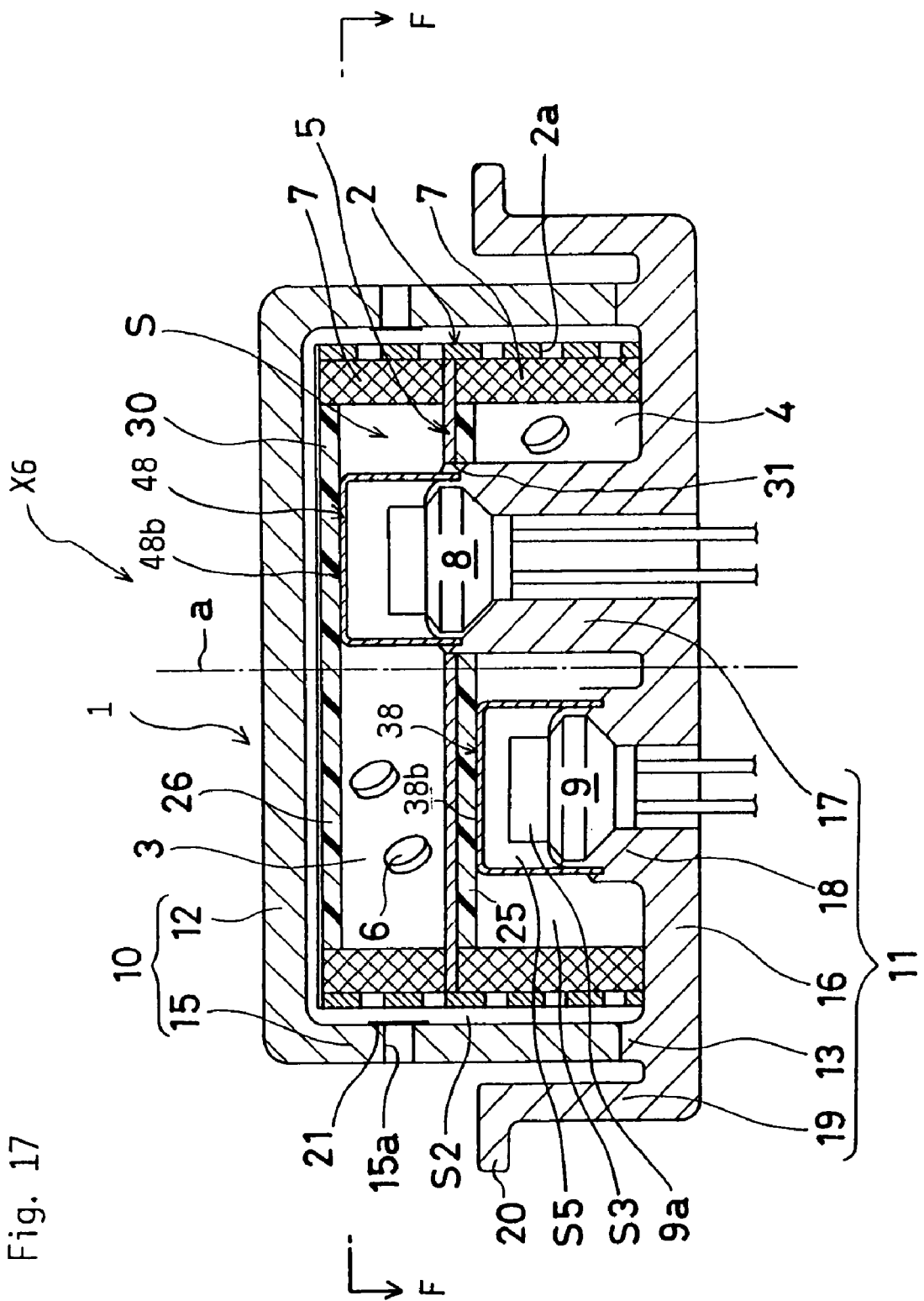
FIG. 17 is a sectional view of a gas generator used for the air bag for the driver's seat according to a seventh modification.
Figure 18:
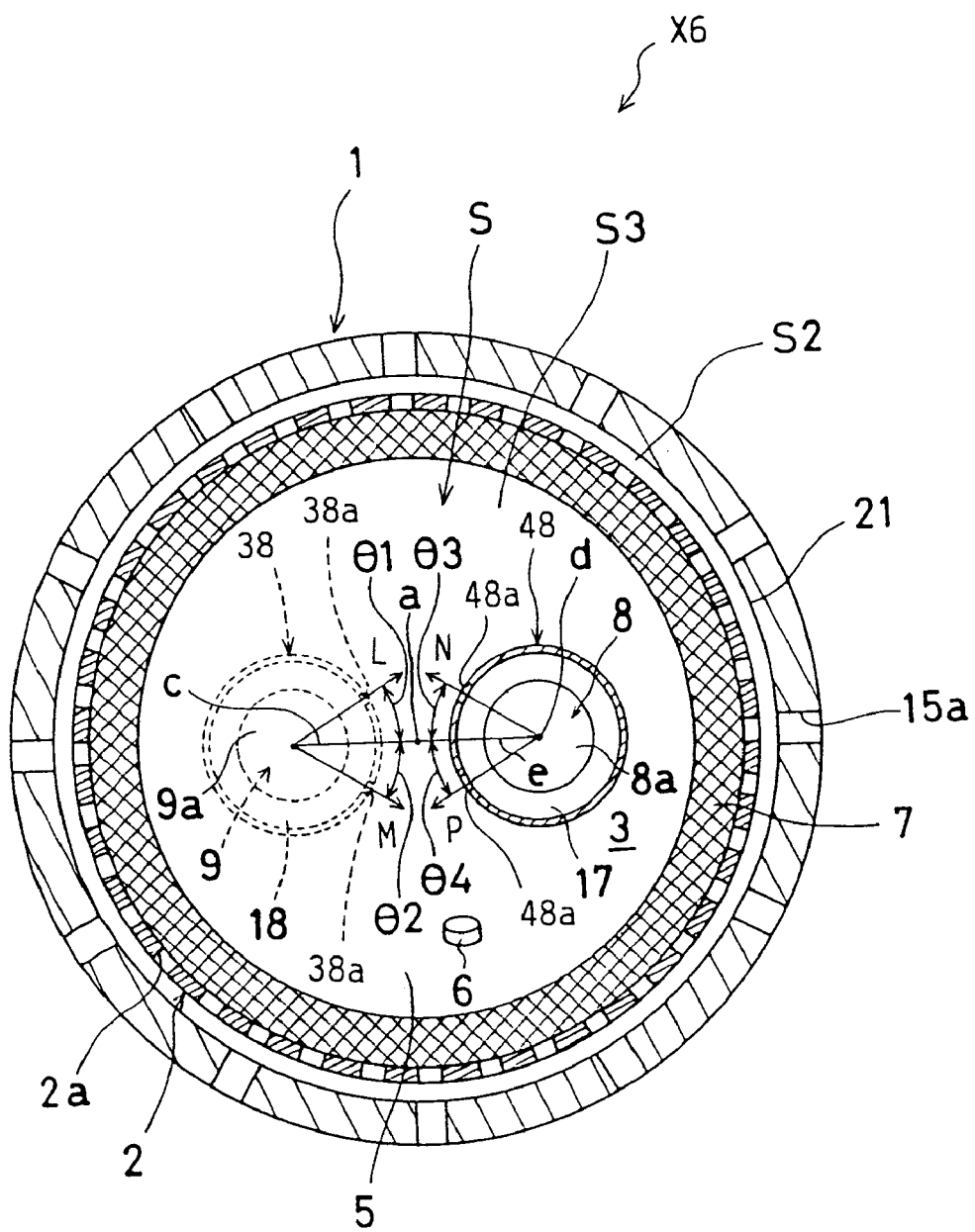
FIG. 18 is a sectional view taken along a line F—F in FIG. 17.

In the gas generator X6 in FIGS. 17 and 18, the deployment process of the air bag can be controlled and the clean gas can be evenly discharged from the respective gas discharge ports 15a by controlling firing flames of the respective eccentric squibs 8, 9. The gas generator X6 has the housing 1 of the double cylindrical structure similar to that in FIGS. 10 and 11 and the same members as those in FIGS. 10, 11 are provided with the same reference numerals. In the gas generator X6, the structure of the squib 9 similar to that in FIGS. 12 and 13 is employed.

In FIGS. 17 and 18, the eccentric squib 8 is mounted in the long inner cylindrical portion 17, and its projected portion 8a is projected into the combustion chamber 3. The projected portion 8a of the squib 8 has a firing agent for being fired in response to the collision detection signal (electrical energy) from the collision sensor and is covered with a cup-shaped firing lid 48 for controlling a spouting direction of the firing flame. The firing lid 48 is fitted in the long inner cylindrical portion 17. A flame space S5 is formed between the firing lid 48 and the projected portion 8a of the squib 8 similarly as FIG. 14. The firing lid 48 has two firing holes 48a for allowing the firing flame of the squib 8 to spout into the upper combustion chamber 3. The respective firing holes 48a open into the flame space S5 above the projected portion 8a of the squib 8 and allow the firing flame or the like which collides with a cup bottom 48b of the firing lid 48 to spout into the upper combustion chamber 3 from the flame space S5 (see FIG. 14). The respective firing holes 48a are formed in two positions N and P on a side facing the axis a of the housing 1 on opposite sides of a straight line e connecting the axis a of the housing 1 and the axis d of the long inner cylindrical portion 17 as a boundary as shown in FIG. 18. In other words, the firing holes 48a in the respective positions N and P open at angles q3 and q4 in opposite directions from the straight line c with respect to the axis d of the long inner cylindrical portion 17 such that the firing flame can spout between the filter member 7 and around the axis a of the housing 1 at a distance from the squib 8. Although the angles q3 and q4 are preferably equal to each other such that the firing flame of the squib 8 spouts evenly around the axis a of the housing 1, the angles q3 and q4 are adjustable so as to uniformly burn all the gas generating agents 6.

The squib 8 is located at the position eccentric to the axis a of the housing 1. The squib 8 fires and burns the gas generating agents 6 in the upper combustion chamber 3 by firing flame that intensively spout around the axis a of the housing 1 away from the squib 8 through the respective firing holes 48a in the firing lid 48.

On the other hand, the projected portion 9a of the squib 9 is covered with the firing lid 38 similarly as FIGS. 12 and 13. The squib 9 is located at the position eccentric to the axis a of the housing 1. The squib 9 fires and burns the gas generating agents 6 in the lower combustion chamber 4 by firing flame that spout around the axis a of the housing 1 away from the squib 9 through the respective firing holes 38a in the firing lid 38.

Next, actuation of the gas generator X6 will be described.

If the collision sensor detects a collision of the automobile, only the squib 8 is actuated. The firing flame of the squib 8 is caused to intensively spout around the axis a of the housing 1 away from the squib 8 through the respective firing holes 48a and the firing flame burns the gas generating agents 6 to thereby generate the high-temperature gas. At this time, combustion in the combustion chamber 3 starts with the gas generating agents 6 in a large area in the vicinity of the squib 8 and around the axis a of the housing 1 at a distance from the squib 8 and then instantaneously moves to the circumferential direction of the housing 1 to shift to overall combustion. Therefore, it is possible to avoid the uneven and local combustion in the vicinity of the squib 8 and to instantaneously shift the combustion to the overall combustion. As a result, it is possible to generate the high-temperature gas in the combustion chamber 3 evenly around the axis a of the housing 1.

The high-temperature gas generated in the upper combustion chamber 3 flows throughout the circumferential direction of the housing 1 and into the filter member 7, is subjected to slag collection and cooling in the filter member 7, and flows into the gas passing space S2 from the respective gas passing holes 2a in the inner cylindrical member 2. When combustion in the upper combustion chamber 3 advances and pressure in the housing 1 reaches a predetermined value, the burst plate 21 bursts and clean gas which has flowed evenly into the gas passing space S2 is discharged from the respective gas discharge ports 15a into the air bag. As a result, the air bag slowly expands and inflates with a small amount of clean gas generated in the upper combustion chamber 3 only and discharged evenly from the respective gas discharge ports 15a.

Then, if the squib 9 is actuated after a short interval from a start of combustion in the upper combustion chamber 3, the firing flame of the squib 9 intensively spouts around the axis a of the housing 1 away from the squib 9 through the respective firing holes 48a and burns the gas generating agents 6 to thereby generate the high-temperature gas. At this time, combustion in the combustion chamber 4 instantaneously shifts to overall combustion similarly to the combustion in the upper combustion chamber 3. Therefore, it is possible to evenly generate the high-temperature gas in the combustion chamber 4 around the axis a of the housing 1.

Then, the high-temperature gas generated in the combustion chamber 4 flows throughout the circumferential direction of the housing 1 and into the filter member 7, is subjected to slag collection and cooling in the filter member 7, and uniformly flows into the gas passing space S2. Because the clean gas which has flowed into the gas passing space S2 evenly flows into the air bag from the respective gas discharge ports 15a in the outer cylindrical portion 15, the air bag shifts to rapid deployment and inflation with the large amount of clean gas discharged from both the combustion chambers 3, 4.

As described above, according to the gas generator X6, because control of inflation of the air bag can be easily carried out and the air bag can be inflated uniformly and smoothly similarly as FIGS. 12 and 13, the inherent function of the air bag can be performed in safety. In the gas generator X6, similarly to the gas generator X1 in FIGS. 1 and 2, the air bag can be inflated according to the form of the collision of the automobile by properly selecting the short interval between actuation of the respective squibs 8, 9.

Figure 19:
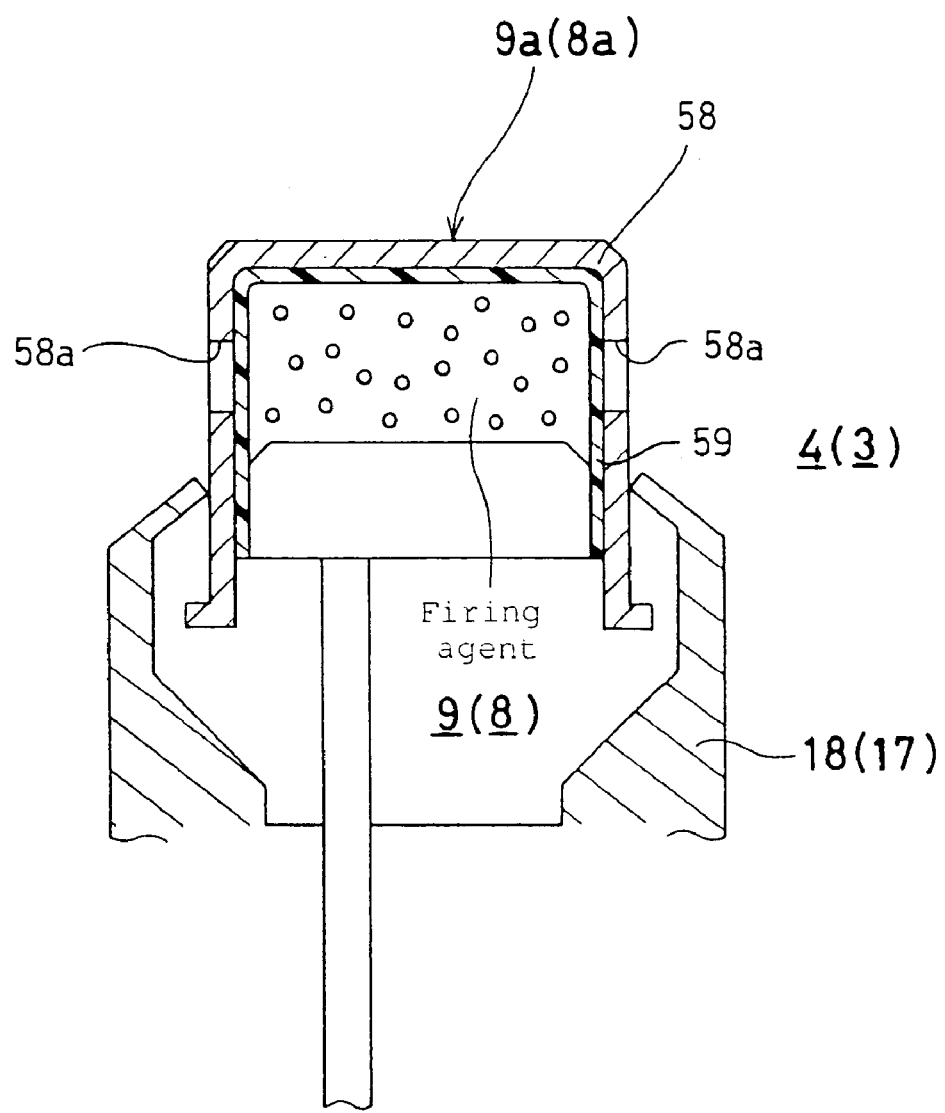
FIG. 19 is an enlarged sectional view of a modification of the eccentric igniter.
Figure 20:
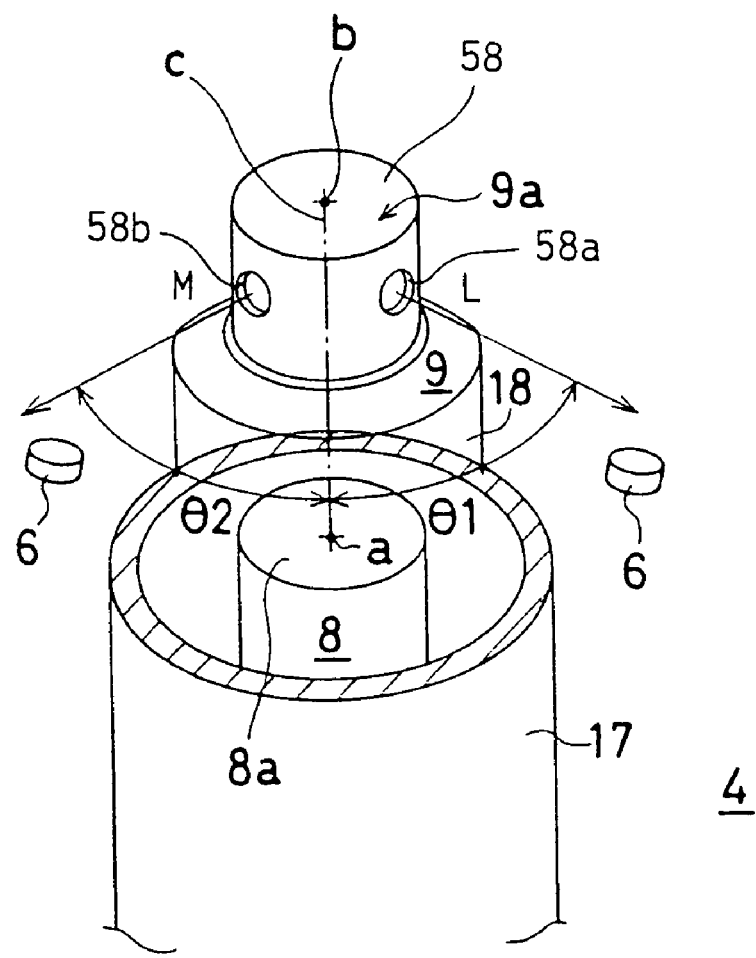
FIG. 20 is an enlarged perspective view of the igniter in FIG. 19.

Although control of the firing flames of the respective eccentric squibs 8, 9 by mounting the firing lids 38 and 48 to the squibs 8 and 9 has been described in the gas generator X6, a structure shown in FIG. 19 may be also employed. In FIG. 19, the projected portion 9a (8a) of the eccentric squib 9 (8) has a cup-shaped firing lid 58 formed with two firing holes 58a and the respective firing holes 58a are closed with a resin seal 59 molded in an inner periphery of the firing lid 58. Inside the resin seal 59, a firing agent for being fired in response to the collision detection signal (electrical energy) from the collision sensor is loaded. The respective firing holes 58a open in respective positions L, M (N, P) of the squib 9 (8) at angles q1, q2 (q3, q4) as shown in FIG. 20. When the resin seal 59 is broken by the firing flame in the firing lid 58, the firing holes 58a open into the combustion chamber 4 (3) to allow the firing flame to spout around the axis a of the housing 1. The number of the firing holes 58a is not limited to two and may be three or more.

As the structure of the squib 9 (8), it is also possible to form the projected portion 9a (8a) of the squib 9 (8) of a covered body in which the firing agent is loaded and to form a plurality of firing grooves from an inside (or an outside) of the covered body. The respective firing grooves are formed in the respective positions L, M (N, P) of the squib 9 (8) to be thinner than the other part and are opened into the combustion chamber 4 (3) as the firing holes by the firing flame in the squib 9 (8). As a result, the firing flame of the squib 9 (8) can be controlled to spout around the axis a of the housing 1.

Next, a gas generator 7 shown in FIGS. 21 and 22 will be described.

Figure 21:
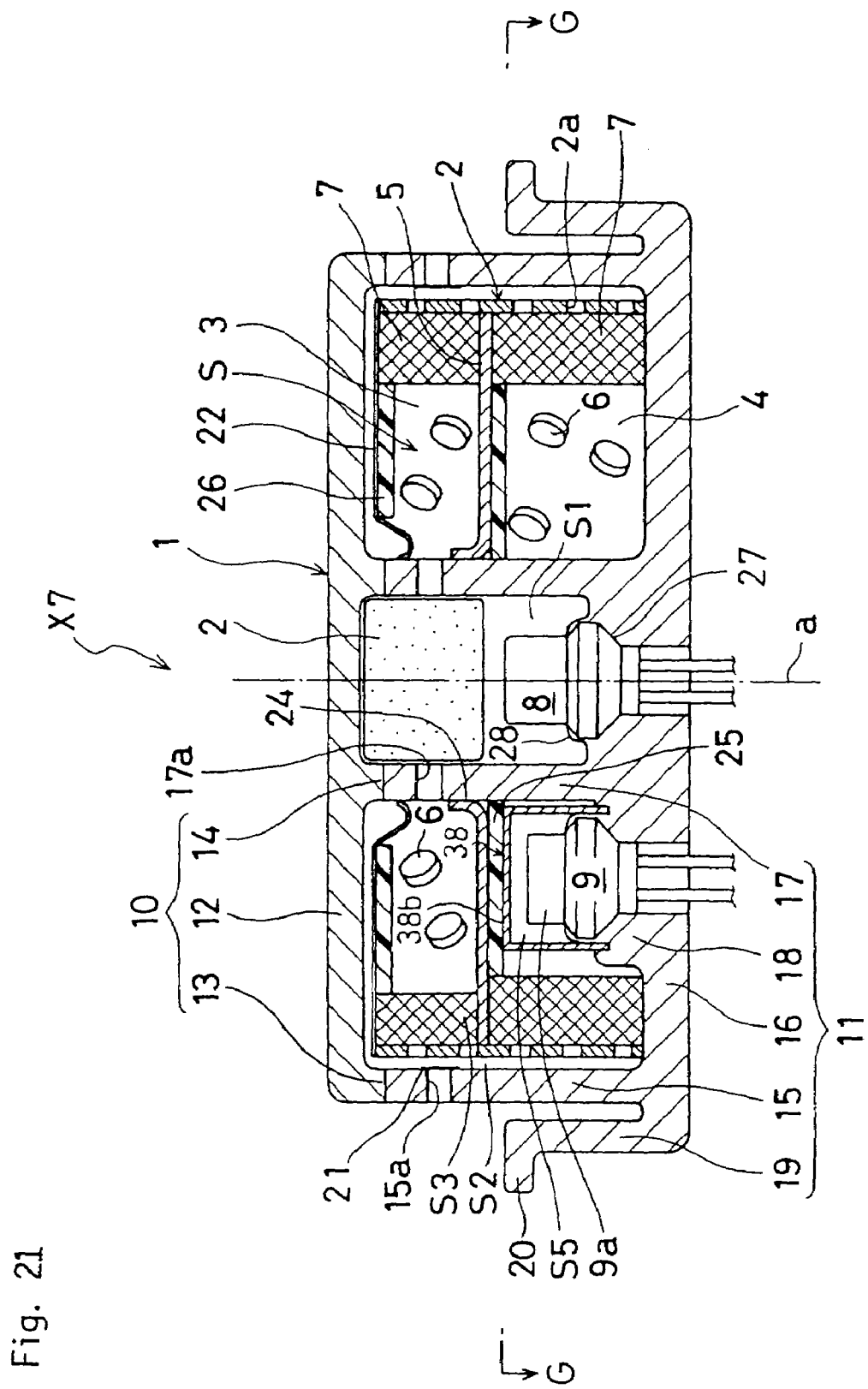
FIG. 21 is a sectional view of a gas generator used for the air bag for the driver's seat according to an eighth modification.
Figure 22:
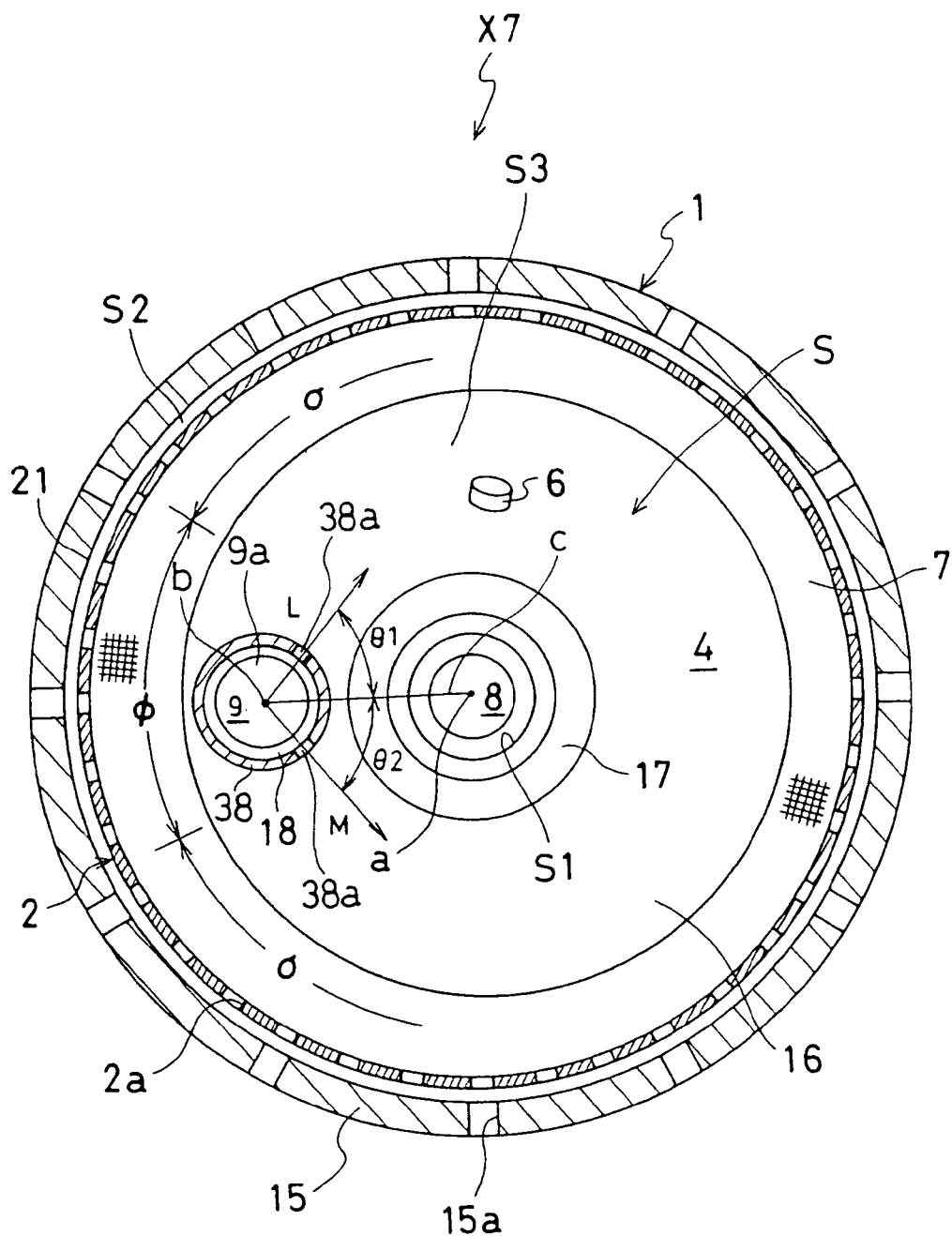
FIG. 22 is a sectional view taken along a line G—G in FIG. 21.
Figure 23:
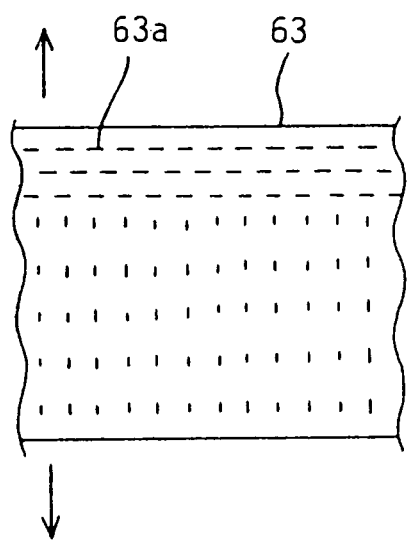
FIGS. 23(a) to 23(c) are drawings showing expanded metal of which an inner cylindrical member is molded.
Figure 23:
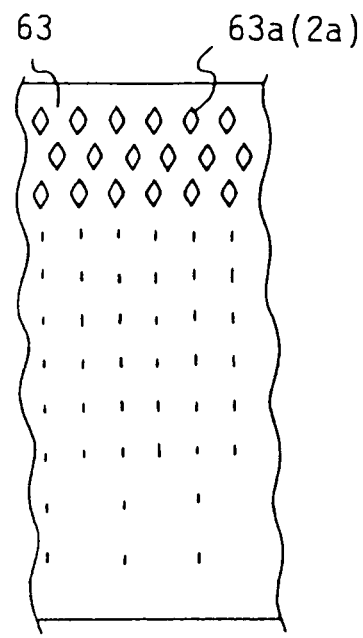
Figure 23:
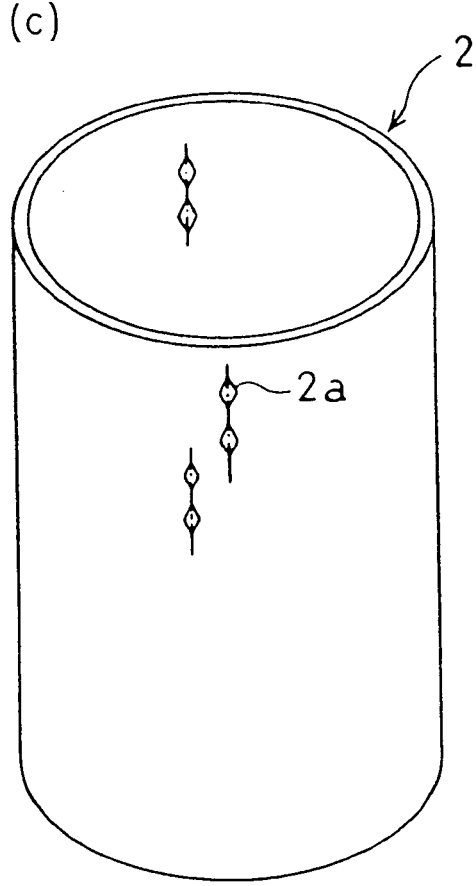

In the gas generator X7 in FIGS. 21 and 22, the deployment process of the air bag can be controlled and the clean gas can be evenly discharged from the respective gas discharge ports 15a by the structure of the filter member 7 and by controlling the firing flame of the eccentric squib 9. The gas generator X7 has the housing 1 having the double cylindrical structure and the filter member 7 similar to those in FIGS. 7 and 8 and the same members as those in FIGS. 7 and 8 are provided with the same reference numerals. In the gas generator X7, the structure of the squib 9 similar to that in FIGS. 12 and 13 is employed.

The filter member 7 in the lower combustion chamber 4 in FIGS. 21 and 22, similarly as FIGS. 7 and 8, has a structure of which the passing of gas through the circumferential part closest to the squib 9 in the short inner cylindrical portion 18 is harder than passing through the circumferential part σ at a distance from the squib 9. The projected portion 9a of the squib 9 is covered with the firing lid 38 similarly as FIGS. 12 and 13. As a result, the squib 9 is disposed in the position eccentric to the axis a of the housing 1 and causes its firing flame to spout around the axis a of the housing 1 away from the squib 9 through the respective firing holes 38a in the firing lid 38 to fire and burn the gas generating agents 6 in the lower combustion chamber 4.

Next, actuation of the gas generator X7 will be described.

If the collision sensor detects a collision of the automobile and only the squib 8 is actuated, the high-temperature gas generated in the upper combustion chamber 3 is subjected to slag collection and cooling in the filter member 7 and made uniformly in the gas passing space S2 and then starts to be discharged into the air bag similarly as FIG. 1. The air bag 3 starts slow deployment and inflation with the small amount of clean gas generated in only the upper combustion chamber 3.

Then, if the squib 9 is actuated after a short interval from a start of combustion in the upper combustion chamber 3, the firing flame of the squib 9 intensively spouts around the axis a of the housing 1 away from the squib 9 through the respective firing holes 38a of the squib 9 and burns the gas generating agents 6 to thereby generate the high-temperature gas. Because combustion in the combustion chamber 4 instantaneously shifts to overall combustion similarly as FIG. 12, it is possible to generate the high-temperature gas in the combustion chamber 4 evenly around the axis a of the housing 1.

The high-temperature gas generated in the lower combustion chamber 4 flows into the filter member 7 from the circumferential part φ close to the squib 9. The high-temperature gas which has flowed into the filter member 7 is distributed in the circumferential direction of the housing 1 and is evenly discharged around the outer cylindrical portion 15 through the gas passing space S2 from the respective gas discharge ports 15a similarly as FIG. 7.

In the gas generator X7, similarly to the gas generator X1 in FIG. 1, the air bag can be inflated according to the form of the collision of the automobile by properly selecting the short interval between actuation of the respective squibs 8, 9.

As described above, according to the gas generator X7, control of inflation of the air bag can be easily carried out. In the gas generator X7, because all the gas generating agents 6 are burned by controlling the firing flame of the squib 9 and the high-temperature gas is distributed in the circumferential direction of the housing 1 by the structure of the filter member 7, it is possible to reliably and evenly discharge the clean gas from the respective gas discharge ports 15a.

In the gas generators X1 to X6 of the invention, any structures of the gas passing holes 2a of the inner cylindrical member 2, the gas discharge ports 15a of the housing 1, the filter member 7, and control of the firing flames of the eccentric squibs 8, 9 are employed. By combining these structures, it is possible to evenly discharge the clean gas from the respective gas discharge ports 15a around the outer cylindrical portion 15.

In the gas generators X1 to X7, although the upper and lower two combustion chambers 3, 4 are defined by the inner cylindrical member 2 and the partition member 5, it is also possible to dispose the filter member 7 in the respective combustion chambers 3, 4 and to partition the inside of the filter member 7 into the upper and lower combustion chambers 3, 4 with the partition member 5 without mounting the inner cylindrical member 2.

In the gas generators X1 to X7, although the respective combustion chambers 3, 4 communicate with each other through the gas passing space S2 and the like, it is also possible to form the airtight combustion chambers 3, 4 by mounting the partition member 5 in the outer cylindrical portion 15.

In the gas generators X1 to X7, it is also possible to define a plurality of combustion chambers by a plurality of partition members 5 and to dispose the squib in each the combustion chamber to thereby carry out multistage control of inflation of the air bag:

Although the gas generators X1 to X7 each having two or more combustion chambers 3, 4 and two or more squibs 8, 9 have been described, the invention is not limited to such gas generators and the following structures can be also employed.

One of such structures is a structure in which one combustion chamber is formed in the housing, and in which the gas generating agents in the combustion chamber are burned by one squib, and in which the squib is disposed eccentrically to the axis of the housing. Another structure is a structure in which one combustion chamber is formed in the housing, and in which the gas generating agents in the combustion chamber are burned by the plural squib, and in which one or more of the squibs are disposed eccentrically to the axis of the housing. In such gas generators, it is possible to evenly discharge the clean gas from the respective gas discharge ports by employing structures described by using FIGS. 1 to 20.

Although the gas generators X1 to X7 for inflating the air bag for the driver's seat have been described, the invention can be also applied to a gas generator for inflating an air bag for a passenger seat or for a side collision. The gas generator for inflating the air bag for the passenger seat or for the side collision includes a long cylindrical housing.

Furthermore, in the gas generators X2 to X7, the inner cylindrical member 2 may be made of expanded metal shown in FIGS. 23(a) to 23(c). In the expanded metal, a plurality of gas passing holes 2a as shown in FIG. 23(b) are formed by uniformly stretching a base metal 63 formed with the large number of slits 63a at predetermined intervals as shown in FIG. 23(a). The inner cylindrical member 2 is formed by forming the expanded metal having predetermined length and width into a cylindrical shape and by securing opposite ends to each other by a joining method such as spot welding as shown in FIG. 23(c). The base metal 63 is made of a stainless steel sheet that had excellent heat resistance and pressure resistance or made of other sheet steel.

Figure 24:
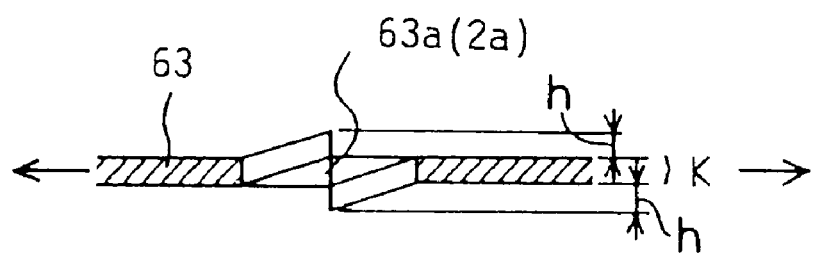
FIG. 24 is a drawing showing an expanded state of the expanded metal in FIG. 23.
Figure 25:
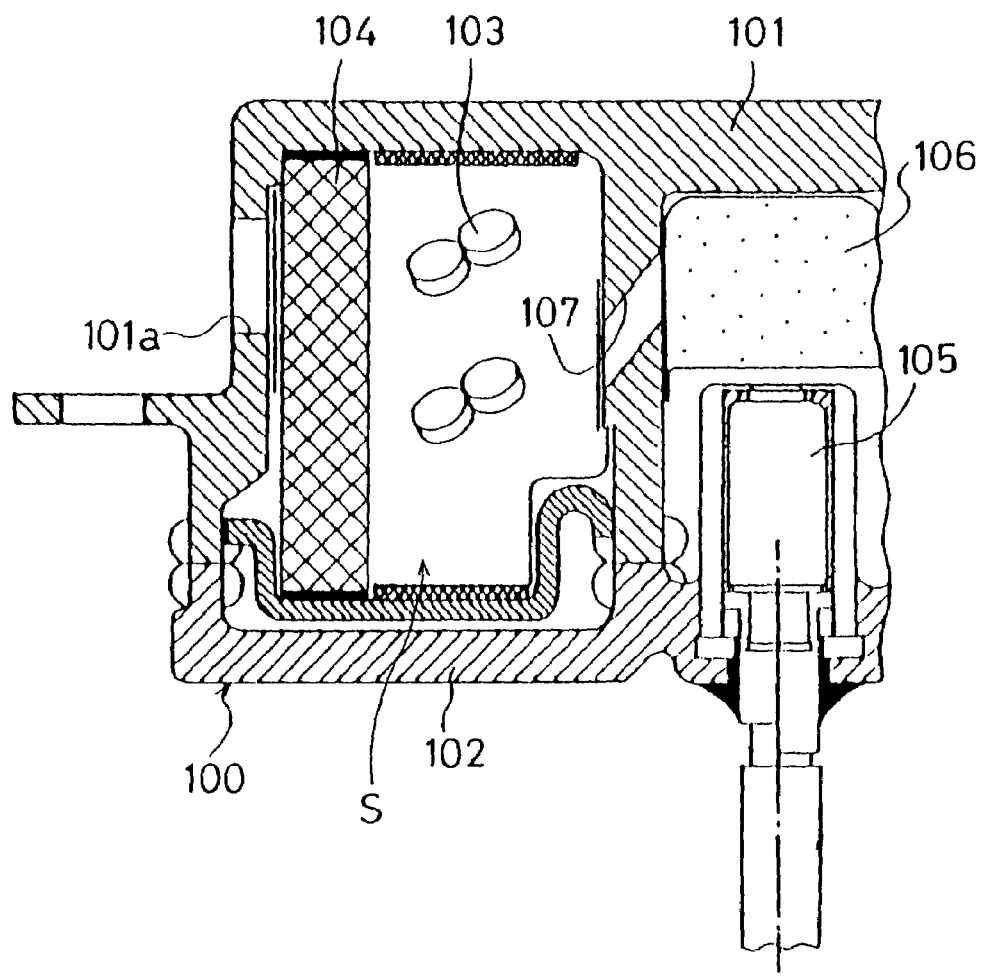
FIG. 25 is a sectional view of a prior-art gas generator used for the air bag for the driver's seat.

If the inner cylindrical member 2 is made of expanded metal, each slit 63a is formed in such a shape as to be bent toward an inner or outer circumferential side by height h from a plane portion K of the base metal 63 as shown in FIG. 24 in stretch processing in a direction of arrows in FIG. 23(a).

Therefore, in the inner cylindrical member 2, the plural gas passing hole 2a projecting to the height h at portions of the respective slits 63a in the outer periphery of the inner cylindrical member 2, opening in the circumferential direction, and extending in the axial direction are formed. The respective gas passing holes 2a are connected to each other in the circumferential direction.

If the inner cylindrical member 2 made of expanded metal is mounted in the housing 1, even if the inner cylindrical member 2 is expanded and deformed by high-pressure and high-temperature gas caused by combustion of the gas generating agents 6 in the respective combustion chambers 3 and 4, the gas can pass toward the respective gas discharge ports 15a from the plurality of gas passing holes 2a projecting by the height h toward the inner and outer peripheries. Therefore, if the inner cylindrical member 2 is formed of expanded metal, even if the inner cylindrical member 2 is disposed to be in contact with an inner circumferential face of the outer cylindrical portion 15, a successive annular space can be formed on an inner circumferential side of the outer cylindrical portion 15 and can be used as the gas passing space S2.

POSSIBILITY OF INDUSTRIAL APPLICATION

As described above, the gas generator according to the present invention is suitable for inflating the air bag for the driver's seat.

What is claimed is:

1. A gas generator comprising a short cylindrical housing, wherein an airtight space in said housing is partitioned into a plurality of combustion chambers, a gas generating agent for generating a high-temperature gas when it burns is loaded in each of said combustion chambers, a plurality of squibs for individually firing and burning said gas generating agents in said respective combustion chambers are mounted in said housing, one or more of said respective squibs are disposed eccentrically to an axis of said housing, and firing flames of said respective eccentric squibs are controlled to spout around said axis of said housing, wherein said eccentric squibs are covered with cup-shaped firing lids having a plurality of firing holes for allowing their firing flames to spout into said respective combustion chambers and said respective firing holes are formed to spout said firing flames around said axis of said housing, wherein the plurality of combustion chambers include an upper chamber and a lower chamber, the upper chamber and the lower chamber having generally coextensive outer boundaries, at least one squib being provided in the upper chamber and at least one squib being provided in the lower chamber.

2. A gas generator comprising a cylindrical housing, wherein a gas generating agent for generating a high-temperature gas when it burns is loaded in each of a plurality of combustion chambers in said housing, a plurality of squibs for firing and burning said gas generating agent are loaded in said housing, one or more of said respective squibs are disposed eccentrically to an axis of said housing, and the one or more squibs are covered with firing lids having firing holes each being provided in a direction that does not extend through the axis of the housing whereby flames of said eccentric squibs are controlled to spout around said axis of said housing, wherein the plurality of combustion chambers include an upper chamber and a lower chamber, the upper chamber and the lower chamber having generally coextensive outer boundaries, at least one squib being provided in the upper chamber and at least one squib being provided in the lower chamber.

* * * * *